US011354273B1

(12) United States Patent
O'Neill et al.

(10) Patent No.: US 11,354,273 B1
(45) Date of Patent: Jun. 7, 2022

(54) MANAGING USABLE STORAGE SPACE IN DISTRIBUTED FILE SYSTEMS

(71) Applicant: Qumulo, Inc., Seattle, WA (US)

(72) Inventors: Kevin Ross O'Neill, Seattle, WA (US); Yuxi Bai, Seattle, WA (US); Tali Magidson, Carnation, WA (US); Philip Michael Bunge, Seattle, WA (US); Carson William Boden, Seattle, WA (US)

(73) Assignee: Qumulo, Inc., Seattle, WA (US)

( * ) Notice: Subject to any disclaimer, the term of this patent is extended or adjusted under 35 U.S.C. 154(b) by 0 days.

(21) Appl. No.: 17/530,420

(22) Filed: Nov. 18, 2021

(51) Int. Cl.
*G06F 17/00* (2019.01)
*G06F 16/17* (2019.01)
*G06F 16/13* (2019.01)
*G06F 16/182* (2019.01)

(52) U.S. Cl.
CPC .......... *G06F 16/1727* (2019.01); *G06F 16/13* (2019.01); *G06F 16/183* (2019.01)

(58) Field of Classification Search
None
See application file for complete search history.

(56) References Cited

U.S. PATENT DOCUMENTS

| | | | |
|---|---|---|---|
| 5,165,031 A | 11/1992 | Pruul et al. | |
| 5,283,875 A * | 2/1994 | Gibson | G06F 3/0601 711/154 |
| 5,319,773 A | 6/1994 | Britton et al. | |
| 5,410,684 A | 4/1995 | Ainsworth et al. | |
| 5,410,719 A | 4/1995 | Shackleford | |
| 5,442,561 A | 8/1995 | Yoshizawa et al. | |
| 5,953,719 A | 9/1999 | Kleewein et al. | |
| 6,236,996 B1 | 5/2001 | Bapat et al. | |
| 6,385,641 B1 | 5/2002 | Jiang et al. | |

(Continued)

FOREIGN PATENT DOCUMENTS

| | | |
|---|---|---|
| EP | 1217551 A2 | 6/2002 |
| EP | 1498829 A1 | 1/2005 |

(Continued)

OTHER PUBLICATIONS

Office Communication for U.S. Appl. No. 16/226,587 dated Aug. 5, 2019, pp. 1-46.

(Continued)

*Primary Examiner* — Hasanul Mobin
(74) *Attorney, Agent, or Firm* — John W. Branch; Branch Partners PLLC

(57) ABSTRACT

Embodiments are directed to managing data in a file system. The file system that includes storage nodes that may be associated with storage volumes that may have a different capacity for storing data. A storage capacity of the file system may be determined based on a number of stripes of data that fit in the file system such that each stripe may be comprised of chunks that have a same chunk storage capacity. Slots in the file system that each match the chunk storage capacity may be determined based on the storage volumes. The chunks may be assigned to the slots in the file system based on the capacity of the storage nodes such that a number of chunks allocated to a same storage volume or a same storage node may be based on protection factor information.

20 Claims, 15 Drawing Sheets

(56) References Cited

U.S. PATENT DOCUMENTS

| | | |
|---|---|---|
| 6,415,283 B1 | 7/2002 | Conklin |
| 6,496,944 B1 | 12/2002 | Hsiao et al. |
| 6,529,998 B1 | 3/2003 | Yochai et al. |
| 6,560,615 B1 | 5/2003 | Zayas et al. |
| 6,772,435 B1 | 8/2004 | Thexton et al. |
| 6,874,130 B1 | 3/2005 | Baweja et al. |
| 6,892,211 B2 | 5/2005 | Hitz et al. |
| 6,965,903 B1 | 11/2005 | Agarwal et al. |
| 6,965,936 B1 | 11/2005 | Wipfel et al. |
| 7,165,158 B1 | 1/2007 | Yagawa |
| 7,213,040 B1 | 5/2007 | Stokes et al. |
| 7,330,948 B2 | 2/2008 | Deguchi et al. |
| 7,594,138 B2 | 9/2009 | Abdulvahid |
| 7,636,743 B2 | 12/2009 | Erofeev |
| 7,693,876 B2 | 4/2010 | Hackworth et al. |
| 7,757,056 B1 | 7/2010 | Fair |
| 7,844,580 B2 | 11/2010 | Srivastava et al. |
| 7,933,870 B1 | 4/2011 | Webster |
| 7,937,421 B2 | 5/2011 | Mikesell et al. |
| 7,962,709 B2 | 6/2011 | Agrawal |
| 7,966,293 B1 | 6/2011 | Owara et al. |
| 8,027,827 B2 | 9/2011 | Bitar et al. |
| 8,046,378 B1 | 10/2011 | Zhuge et al. |
| 8,108,429 B2 | 1/2012 | Sim-Tang et al. |
| 8,296,312 B1 | 10/2012 | Leung et al. |
| 8,355,407 B2 | 1/2013 | Wookey et al. |
| 8,364,648 B1 | 1/2013 | Sim-Tang |
| 8,423,733 B1 | 4/2013 | Ozdemir |
| 8,448,170 B2 | 5/2013 | Wipfel et al. |
| 8,463,825 B1 | 6/2013 | Harty et al. |
| 8,489,656 B2 | 7/2013 | Erofeev |
| 8,504,733 B1 | 8/2013 | Iyer et al. |
| 8,515,911 B1 | 8/2013 | Zhou et al. |
| 8,612,404 B2 | 12/2013 | Bone et al. |
| 8,612,488 B1 | 12/2013 | Subramanya et al. |
| 8,645,323 B2 | 2/2014 | Jackiewicz et al. |
| 8,661,447 B1 | 2/2014 | Olliff et al. |
| 8,725,691 B1 | 5/2014 | Natanzon |
| 8,776,050 B2 | 7/2014 | Plouffe et al. |
| 8,782,655 B2 | 7/2014 | Blanding et al. |
| 8,806,154 B1 | 8/2014 | Gupta et al. |
| 8,838,887 B1 | 9/2014 | Burke et al. |
| 8,838,931 B1 | 9/2014 | Marshak et al. |
| 8,849,764 B1 | 9/2014 | Long et al. |
| 8,868,797 B1 | 10/2014 | Kirac et al. |
| 8,924,364 B1 | 12/2014 | Zhong et al. |
| 8,972,694 B1 | 3/2015 | Dolan et al. |
| 9,015,214 B2 | 4/2015 | Nishida et al. |
| 9,026,765 B1 | 5/2015 | Marshak et al. |
| 9,047,017 B1 | 6/2015 | Dolan et al. |
| 9,141,633 B1 | 9/2015 | Li et al. |
| 9,143,379 B1 | 9/2015 | Berger et al. |
| 9,158,653 B2 | 10/2015 | Gold |
| 9,171,145 B2 | 10/2015 | Dash et al. |
| 9,244,975 B2 | 1/2016 | Das et al. |
| 9,244,976 B1 | 1/2016 | Zhang et al. |
| 9,384,252 B2 | 7/2016 | Akirav et al. |
| 9,459,804 B1 | 10/2016 | Natanzon et al. |
| 9,501,487 B1 | 11/2016 | Yuan et al. |
| 9,547,560 B1 | 1/2017 | Lee |
| 9,600,193 B2 | 3/2017 | Ahrens et al. |
| 9,727,432 B1 | 8/2017 | Cutforth et al. |
| 9,747,171 B2 | 8/2017 | Beeken et al. |
| 9,753,782 B2 | 9/2017 | Fang et al. |
| 9,753,932 B1 | 9/2017 | Brow et al. |
| 9,785,377 B2 | 10/2017 | Shin et al. |
| 10,140,185 B1 | 11/2018 | Lopez et al. |
| 10,261,868 B2 | 4/2019 | Brown et al. |
| 10,275,493 B1 | 4/2019 | Mostak |
| 10,303,561 B2 | 5/2019 | Beeken et al. |
| 10,318,401 B2 | 6/2019 | Rothschilds et al. |
| 10,339,101 B1 | 7/2019 | Gupta |
| 10,423,609 B1 | 9/2019 | Strauss |
| 10,437,509 B1 | 10/2019 | Alexeev et al. |
| 10,447,779 B2 | 10/2019 | Dieterich et al. |
| 10,474,635 B1 | 11/2019 | Unger et al. |
| 10,534,758 B1 | 1/2020 | Carpenter et al. |
| 10,664,408 B1* | 5/2020 | Chatterjee .............. G06F 3/067 |
| 10,678,663 B1 | 6/2020 | Sharma et al. |
| 10,725,977 B1 | 7/2020 | Chmiel et al. |
| 10,795,796 B1* | 10/2020 | Bai .................. G06F 11/3452 |
| 2001/0039622 A1 | 11/2001 | Hitz et al. |
| 2002/0065835 A1 | 5/2002 | Fujisaki |
| 2002/0083073 A1 | 6/2002 | Vaidya et al. |
| 2002/0099691 A1 | 7/2002 | Lore et al. |
| 2002/0178271 A1 | 11/2002 | Graham et al. |
| 2003/0033308 A1 | 2/2003 | Patel et al. |
| 2003/0145009 A1 | 7/2003 | Forman et al. |
| 2003/0177379 A1 | 9/2003 | Hori et al. |
| 2003/0182313 A1 | 9/2003 | Federwisch et al. |
| 2004/0030727 A1 | 2/2004 | Armangau et al. |
| 2004/0093474 A1 | 5/2004 | Lin et al. |
| 2004/0098425 A1 | 5/2004 | Wiss et al. |
| 2004/0153479 A1 | 8/2004 | Mikesell et al. |
| 2004/0255048 A1 | 12/2004 | Lev Ran et al. |
| 2005/0015674 A1 | 1/2005 | Haugh |
| 2005/0027748 A1 | 2/2005 | Kisley |
| 2005/0065986 A1 | 3/2005 | Bixby et al. |
| 2005/0091663 A1 | 4/2005 | Bagsby |
| 2005/0114726 A1 | 5/2005 | Ouchi |
| 2005/0119996 A1 | 6/2005 | Ohata et al. |
| 2005/0154866 A1 | 7/2005 | Steely, Jr. et al. |
| 2005/0195660 A1 | 9/2005 | Kavuri et al. |
| 2005/0223019 A1 | 10/2005 | Das et al. |
| 2006/0004890 A1 | 1/2006 | Semple et al. |
| 2006/0053139 A1 | 3/2006 | Marzinski et al. |
| 2006/0089982 A1 | 4/2006 | Abbott et al. |
| 2006/0090036 A1 | 4/2006 | Zohar et al. |
| 2006/0123005 A1 | 6/2006 | Burnett et al. |
| 2006/0173842 A1 | 8/2006 | Horvitz et al. |
| 2006/0271604 A1 | 11/2006 | Shoens |
| 2007/0011302 A1 | 1/2007 | Groner et al. |
| 2007/0027985 A1 | 2/2007 | Ramany et al. |
| 2007/0100855 A1 | 5/2007 | T. Kohl |
| 2007/0118561 A1 | 5/2007 | Idicula et al. |
| 2007/0143371 A1 | 6/2007 | Kottomtharayil |
| 2008/0028006 A1 | 1/2008 | Liu et al. |
| 2008/0059399 A1 | 3/2008 | DeLorme et al. |
| 2008/0059541 A1 | 3/2008 | Fachan et al. |
| 2008/0082593 A1 | 4/2008 | Komarov et al. |
| 2008/0162608 A1 | 7/2008 | Torii et al. |
| 2008/0172366 A1 | 7/2008 | Hannel et al. |
| 2008/0228772 A1 | 9/2008 | Plamondon |
| 2008/0250357 A1 | 10/2008 | Lee et al. |
| 2008/0256474 A1 | 10/2008 | Chakra et al. |
| 2008/0270469 A1 | 10/2008 | Myerson et al. |
| 2008/0270928 A1 | 10/2008 | Chakra et al. |
| 2008/0282244 A1 | 11/2008 | Wu et al. |
| 2008/0288306 A1 | 11/2008 | MacIntyre et al. |
| 2008/0301256 A1 | 12/2008 | McWilliams et al. |
| 2008/0313217 A1 | 12/2008 | Dunsmore et al. |
| 2009/0077087 A1 | 3/2009 | Urano et al. |
| 2009/0138500 A1 | 5/2009 | Yuan et al. |
| 2009/0199190 A1 | 8/2009 | Chen et al. |
| 2009/0222509 A1 | 9/2009 | King et al. |
| 2009/0240539 A1 | 9/2009 | Slawson et al. |
| 2009/0274047 A1 | 11/2009 | Kruys et al. |
| 2009/0319566 A1 | 12/2009 | Wald et al. |
| 2009/0327642 A1* | 12/2009 | Ogihara .............. G06F 11/008 711/170 |
| 2010/0030825 A1 | 2/2010 | Matsuzawa et al. |
| 2010/0036895 A1 | 2/2010 | Boyd et al. |
| 2010/0088317 A1 | 4/2010 | Bone et al. |
| 2010/0161557 A1 | 6/2010 | Anderson et al. |
| 2010/0179959 A1 | 7/2010 | Shoens |
| 2010/0217948 A1 | 8/2010 | Mason et al. |
| 2010/0241668 A1 | 9/2010 | Susanto et al. |
| 2010/0281214 A1 | 11/2010 | Jernigan, IV |
| 2010/0287512 A1 | 11/2010 | Gan et al. |
| 2011/0039622 A1 | 2/2011 | Levenson |
| 2011/0066668 A1 | 3/2011 | Guarraci |
| 2011/0082836 A1 | 4/2011 | Wang et al. |
| 2011/0125799 A1 | 5/2011 | Kandasamy et al. |
| 2011/0125973 A1 | 5/2011 | Lev et al. |

(56) References Cited

U.S. PATENT DOCUMENTS

| | | |
|---|---|---|
| 2011/0161381 A1 | 6/2011 | Wang et al. |
| 2011/0161964 A1 | 6/2011 | Piazza et al. |
| 2011/0196833 A1 | 8/2011 | Drobychev et al. |
| 2011/0196899 A1 | 8/2011 | Hughes et al. |
| 2011/0202925 A1 | 8/2011 | Banerjee et al. |
| 2011/0246724 A1 | 10/2011 | Marathe et al. |
| 2012/0036463 A1 | 2/2012 | Krakovsky et al. |
| 2012/0066179 A1 | 3/2012 | Saika |
| 2012/0096059 A1 | 4/2012 | Shimizu et al. |
| 2012/0136843 A1 | 5/2012 | Bone et al. |
| 2012/0151438 A1 | 6/2012 | Bach et al. |
| 2012/0166478 A1 | 6/2012 | Das et al. |
| 2012/0179886 A1 | 7/2012 | Prahlad et al. |
| 2012/0204060 A1 | 8/2012 | Swift et al. |
| 2012/0216005 A1 | 8/2012 | Naito et al. |
| 2012/0317079 A1 | 12/2012 | Shoens et al. |
| 2013/0019072 A1 | 1/2013 | Strasser et al. |
| 2013/0024609 A1 | 1/2013 | Gorobets et al. |
| 2013/0073819 A1 | 3/2013 | Havewala et al. |
| 2013/0086121 A1 | 4/2013 | Preslan |
| 2013/0091168 A1 | 4/2013 | Bhave et al. |
| 2013/0110787 A1 | 5/2013 | Garimella et al. |
| 2013/0191355 A1 | 7/2013 | Bone et al. |
| 2013/0212579 A1 | 8/2013 | Ben-Shaul et al. |
| 2013/0227236 A1 | 8/2013 | Flynn et al. |
| 2013/0304903 A1 | 11/2013 | Mick et al. |
| 2013/0311454 A1 | 11/2013 | Ezzat |
| 2013/0318194 A1 | 11/2013 | Timbs |
| 2013/0325806 A1 | 12/2013 | Bachar et al. |
| 2013/0325808 A1 | 12/2013 | Bachar et al. |
| 2013/0339406 A1 | 12/2013 | Kanfi |
| 2014/0006354 A1 | 1/2014 | Parkinson et al. |
| 2014/0040199 A1 | 2/2014 | Golab et al. |
| 2014/0040693 A1 | 2/2014 | Kim et al. |
| 2014/0059158 A1* | 2/2014 | Chen ............... H04L 29/08549 709/213 |
| 2014/0095249 A1 | 4/2014 | Tarakad et al. |
| 2014/0101389 A1 | 4/2014 | Nellans et al. |
| 2014/0156956 A1 | 6/2014 | Ezra |
| 2014/0181441 A1 | 6/2014 | Kottomtharayil et al. |
| 2014/0189267 A1 | 7/2014 | Qi et al. |
| 2014/0237193 A1 | 8/2014 | Shivashankaraiah |
| 2014/0258609 A1 | 9/2014 | Cui et al. |
| 2014/0280485 A1 | 9/2014 | A Hummaida et al. |
| 2014/0281307 A1 | 9/2014 | Peterson et al. |
| 2014/0281411 A1 | 9/2014 | Abdallah |
| 2014/0344222 A1 | 11/2014 | Morris et al. |
| 2014/0372384 A1 | 12/2014 | Long et al. |
| 2014/0372607 A1 | 12/2014 | Gladwin et al. |
| 2014/0373032 A1 | 12/2014 | Merry et al. |
| 2015/0006226 A1 | 1/2015 | Smith et al. |
| 2015/0012666 A1 | 1/2015 | Pannese et al. |
| 2015/0067086 A1* | 3/2015 | Adriaens ........... G06F 15/17331 709/212 |
| 2015/0067142 A1 | 3/2015 | Renkema |
| 2015/0106145 A1 | 4/2015 | Hamilton et al. |
| 2015/0135331 A1 | 5/2015 | Das |
| 2015/0143026 A1 | 5/2015 | Reddy et al. |
| 2015/0149736 A1 | 5/2015 | Kwon et al. |
| 2015/0186217 A1 | 7/2015 | Eslami Sarab |
| 2015/0186529 A1 | 7/2015 | Rope et al. |
| 2015/0193347 A1 | 7/2015 | Kluesing et al. |
| 2015/0215405 A1 | 7/2015 | Baek et al. |
| 2015/0234716 A1 | 8/2015 | Brooker et al. |
| 2015/0234879 A1 | 8/2015 | Baldwin et al. |
| 2015/0242263 A1 | 8/2015 | Klose |
| 2015/0248253 A1* | 9/2015 | Kim .................. G06F 16/951 707/723 |
| 2015/0278282 A1 | 10/2015 | Sardina et al. |
| 2015/0310035 A1 | 10/2015 | Godman et al. |
| 2015/0347126 A1 | 12/2015 | Tibble et al. |
| 2016/0034356 A1 | 2/2016 | Aron et al. |
| 2016/0139836 A1 | 5/2016 | Nallathambi et al. |
| 2016/0147654 A1 | 5/2016 | Zhao et al. |
| 2016/0224430 A1 | 8/2016 | Long et al. |
| 2016/0246816 A1 | 8/2016 | Abiri et al. |
| 2016/0269501 A1 | 9/2016 | Usgaonkar et al. |
| 2016/0292013 A1 | 10/2016 | Li et al. |
| 2016/0306810 A1 | 10/2016 | Ni et al. |
| 2016/0314046 A1 | 10/2016 | Kumarasamy |
| 2016/0335278 A1 | 11/2016 | Tabaaloute et al. |
| 2016/0357677 A1 | 12/2016 | Hooker et al. |
| 2016/0359859 A1 | 12/2016 | Capone |
| 2016/0371297 A1 | 12/2016 | Okun et al. |
| 2016/0380878 A1 | 12/2016 | Bugenhagen et al. |
| 2017/0024152 A1 | 1/2017 | Bhagi et al. |
| 2017/0032006 A1 | 2/2017 | Anglin et al. |
| 2017/0046143 A1 | 2/2017 | Kochhar et al. |
| 2017/0052898 A1 | 2/2017 | Ash et al. |
| 2017/0078164 A1 | 3/2017 | Hildebrand et al. |
| 2017/0091046 A1 | 3/2017 | Bangalore et al. |
| 2017/0118287 A1 | 4/2017 | Beck |
| 2017/0123883 A1 | 5/2017 | Hall |
| 2017/0123935 A1 | 5/2017 | Pandit et al. |
| 2017/0163728 A1 | 6/2017 | Chawla et al. |
| 2017/0201582 A1 | 7/2017 | Zhang et al. |
| 2017/0206231 A1* | 7/2017 | Binder ................. G06T 15/06 |
| 2017/0286455 A1 | 10/2017 | Li et al. |
| 2017/0316321 A1 | 11/2017 | Whitney et al. |
| 2017/0336983 A1 | 11/2017 | Roh et al. |
| 2017/0344598 A1 | 11/2017 | Constantinescu et al. |
| 2017/0344905 A1 | 11/2017 | Hack et al. |
| 2017/0366609 A1 | 12/2017 | Dieterich et al. |
| 2018/0040029 A1 | 2/2018 | Zeng et al. |
| 2018/0059946 A1 | 3/2018 | Kunii et al. |
| 2018/0089031 A1 | 3/2018 | Mitkar et al. |
| 2018/0101546 A1 | 4/2018 | Krasnow et al. |
| 2018/0129443 A1 | 5/2018 | Karve et al. |
| 2018/0203798 A1 | 7/2018 | Hughes et al. |
| 2018/0276078 A1 | 9/2018 | Blea et al. |
| 2018/0288057 A1 | 10/2018 | Varadamma et al. |
| 2018/0314423 A1 | 11/2018 | Gong et al. |
| 2018/0365115 A1 | 12/2018 | Fang et al. |
| 2019/0095112 A1 | 3/2019 | Lingarajappa |
| 2019/0102700 A1 | 4/2019 | Babu et al. |
| 2019/0163589 A1 | 5/2019 | McBride et al. |
| 2019/0163591 A1 | 5/2019 | Ouyang et al. |
| 2019/0196879 A1 | 6/2019 | Dutta et al. |
| 2019/0286521 A1 | 9/2019 | Okpotse et al. |
| 2019/0286528 A1 | 9/2019 | Wu et al. |
| 2019/0384640 A1 | 12/2019 | Swamy et al. |
| 2020/0004977 A1 | 1/2020 | Araujo et al. |
| 2020/0026438 A1 | 1/2020 | Peleg et al. |
| 2020/0034077 A1 | 1/2020 | Haravu et al. |
| 2020/0174692 A1 | 6/2020 | Dave et al. |
| 2021/0004355 A1* | 1/2021 | Iwase ................ G06F 16/152 |
| 2021/0042263 A1 | 2/2021 | Zdornov et al. |
| 2021/0042282 A1 | 2/2021 | Cseri et al. |
| 2021/0056074 A1* | 2/2021 | Zhu ...................... G06F 3/06 |
| 2021/0110150 A1* | 4/2021 | Kakrana ............. G06V 30/414 |
| 2021/0311841 A1 | 10/2021 | McNutt |
| 2021/0374105 A1* | 12/2021 | Kodama ............ G06F 16/1727 |
| 2022/0019361 A1* | 1/2022 | Kurata ................ G06F 3/0619 |

FOREIGN PATENT DOCUMENTS

| | | |
|---|---|---|
| WO | 1999044145 A1 | 9/1999 |
| WO | 0072201 A1 | 11/2000 |
| WO | 2009007250 A2 | 1/2009 |
| WO | 2012029259 A1 | 3/2012 |

OTHER PUBLICATIONS

Office Communication for U.S. Appl. No. 16/228,716 dated Jun. 24, 2019, pp. 1-10.

Office Communication for U.S. Appl. No. 16/262,756 dated Jul. 10, 2019, pp. 1-8.

Office Communication for U.S. Appl. No. 16/262,756 dated Aug. 5, 2019, pp. 1-35.

Office Communication for U.S. Appl. No. 15/967,499 dated Jun. 27, 2018, pp. 1-16.

Office Communication for U.S. Appl. No. 16/226,587 dated Feb. 25, 2019, pp. 1-43.

(56) References Cited

OTHER PUBLICATIONS

Office Communication for U.S. Appl. No. 16/228,716 dated Feb. 28, 2019, pp. 1-15.
Office Communication for U.S. Appl. No. 16/231,354 dated Mar. 25, 2019, pp. 1-10.
Office Communication for U.S. Appl. No. 16/262,756 dated Apr. 2, 2019, pp. 1-29.
Office Communication for U.S. Appl. No. 16/262,790 dated Aug. 23, 2019, pp. 1-16.
Office Communication for U.S. Appl. No. 16/262,756 dated Apr. 18, 2019, pp. 1-14.
Office Communication for U.S. Appl. No. 16/262,756 dated Oct. 25, 2019, pp. 1-4.
Office Communication for U.S. Appl. No. 16/659,488 dated Dec. 30, 2019, pp. 1-6.
Office Communication for U.S. Appl. No. 14/595,598 dated Dec. 31, 2019, pp. 1-16.
Office Communication for U.S. Appl. No. 16/004,208 dated Aug. 27, 2018, pp. 1-11.
Office Communication for U.S. Appl. No. 16/234,395 dated Aug. 8, 2019, pp. 1-10.
Office Communication for U.S. Appl. No. 16/234,334 dated Apr. 5, 2019, pp. 1-15.
Office Communication for U.S. Appl. No. 16/234,395 dated Mar. 28, 2019, pp. 1-10.
Kappes Giorgos et al., "Dike: Virtualization-aware Access Control for Multitenant Filesystems", Feb. 18, 2013, pp. 1-6.
Hitz, Dave et al., "Merging NT and UNIX filesystem Permissions", Proceedings of the 2nd USENiX Windows NT Symposium, Seattle, Washington, Aug. 3-4, 1998, pp. 1-10.
Office Communication for U.S. Appl. No. 16/234,334 dated Oct. 11, 2019, pp. 1-16.
Office Communication for U.S. Appl. No. 15/473,051 dated Jun. 30, 2017, pp. 1-23.
Extended European Search Report for European Patent Application No. 18155779.4 dated Apr. 17, 2018, pp. 1-15.
Office Communication for U.S. Appl. No. 16/004,182 dated Aug. 23, 2018, pp. 1-43.
Office Communication for U.S. Appl. No. 16/004,182 dated Mar. 5, 2019, pp. 1-46.
Office Communication for U.S. Appl. No. 16/004,182 dated Jul. 3, 2019, pp. 1-45.
Office Communication for U.S. Appl. No. 15/694,604 dated Jun. 3, 2019, pp. 1-8.
Office Communication for U.S. Appl. No. 16/004,182 dated May 22, 2019, pp. 1-4.
Office Communication for U.S. Appl. No. 14/595,043 dated May 4, 2017, pp. 1-30.
Office Communication for U.S. Appl. No. 14/595,043 dated Feb. 23, 2018, pp. 1-16.
Office Communicatien for U.S. Appl. No. 14/595,043 dated May 25, 2018, pp. 1-7.
Office Communication for U.S. Appl. No. 14/595,043 dated Oct. 5, 2018, pp. 1-17.
Office Communication for U.S. Appl. No. 14/595,043 dated Jun. 7, 2019, pp. 1-19.
Office Communication for U.S. Appl. No. 14/595,043 dated Aug. 27, 2019, pp. 1-17.
Office Communication for U.S. Appl. No. 14/658,015 dated Apr. 27, 2017, pp. 1-7.
Office Communication for U.S. Appl. No. 14/658,015 dated Jan. 4, 2018, pp. 1-28.
Office Communication for U.S. Appl. No. 14/658,015 dated Jul. 13, 2018, pp. 1-8.
Office Communication for U.S. Appl. No. 14/859,061 dated Sep. 22, 2017, pp. 1-16.
Office Communication for U.S. Appl. No. 15/831,236 dated Mar. 30, 2018, pp. 1-8.
Office Communication for U.S. Appl. No. 15/831,236 dated Aug. 15, 2018, pp. 1-14.
Office Communication for U.S. Appl. No. 14/859,114 dated Jul. 24, 2017, pp. 1-41.
Office Communication for U.S. Appl. No. 14/859,114 dated Feb. 21, 2018, pp. 1-25.
Office Communication for U.S. Appl. No. 14/859,114 dated May 11, 2018, pp. 1-5.
Office Communication for U.S. Appl. No. 14/859,114 dated Jun. 27, 2018, pp. 1-33.
Office Communication for U.S. Appl. No. 14/859,114 dated Nov. 19, 2018, pp. 1-35.
Office Communication for U.S. Appl. No. 14/859,114 dated Jan. 31, 2019, pp. 1-4.
Office Communication for U.S. Appl. No. 14/859,114 dated Mar. 7, 2019, pp. 1-32.
Office Communication for U.S. Appl. No. 14/859,114 dated Jun. 26, 2019, pp. 1-21.
Office Communication for U.S. Appl. No. 14/859,114 dated Sep. 13, 2019, pp. 1-6.
Office Communication for U.S. Appl. No. 14/859,114 dated Nov. 26, 2019, pp. 1-21.
Office Communication for U.S. Appl. No. 15/288,853 dated Sep. 19, 2018, pp. 1-13.
Chimera, Richard, "Value Bars: An Information Visualization and Navigation Tool for Multi-attribute Listings", CHI '92, Monterey, CA, May 3-7, 1992, pp. 293-294.
Office Communication for U.S. Appl. No. 15/288,853 dated Mar. 25, 2019, pp. 1-10.
Cudre-Mauroux, Philippe et al., "TrajStore: An Adaptive Storage System for Very Large Trajectory Sets", ICDE 2010, Long Beach, CA, Mar. 1-6, 2010, pp. 109-120.
Office Communication for U.S. Appl. No. 16/436,825 dated Jul. 11, 2019, pp. 1-9.
Office Communication for U.S. Appl. No. 15/474,047 dated Sep. 18, 2017, pp. 1-14.
Office Communication for U.S. Appl. No. 15/474,047 dated Mar. 9, 2018, pp. 1-8.
Office Communication for U.S. Appl. No. 15/474,047 dated Jun. 11, 2018, pp. 1-6.
Office Communication for U.S. Appl. No. 15/474,047 dated Aug. 15, 2018, pp. 1-11.
Office Communication for U.S. Appl. No. 15/957,809 dated Jun. 28, 2018, pp. 1-27.
Office Communication for U.S. Appl. No. 15/957,809 dated Jan. 24, 2019, pp. 1-11.
Office Communication for U.S. Appl. No. 16/434,157 dated Jul. 25, 2019, pp. 1-8.
Office Communication for U.S. Appl. No. 15/854,447 dated Aug. 30, 2019, pp. 1-9.
Office Communication for U.S. Appl. No. 16/505,562 dated Aug. 30, 2019, pp. 1-11.
Extended European Search Report for European Patent Application No. 17206518.7 dated Apr. 5, 2018, pp. 1-8.
Karatza et al., "Epoch Load Sharing in a Network of Workstations," Simulation Symposium, 2001. Proceedings. 34th Annual Apr. 22-26, 2001, Piscataway, NJ, USA, IEEE, XP010541274, ISBN: 978-0-7695-1092-7, pp. 36-42.
Office Communication for U.S. Appl. No. 16/004,182 dated Jan. 7, 2020, pp. 1-46.
Office Communication for U.S. Appl. No. 16/125,573 dated Nov. 21, 2019, pp. 1-13.
Office Communication for U.S. Appl. No. 16/226,587 dated Oct. 24, 2019, pp. 1-4.
Office Communication for U.S. Appl. No. 16/262,790 dated Dec. 12, 2019, pp. 1-10.
Office Communication for U.S. Appl. No. 16/234,334 dated Jan. 16, 2020, pp. 1-8.
Office Communication for U.S. Appl. No. 15/694,604 dated Nov. 20, 2019, pp. 1-8.
Office Communication for U.S. Appl. No. 16/262,756 dated Jan. 23, 2020, pp. 1-21.
Office Communication for U.S. Appl. No. 16/434,157 dated Jan. 29, 2020, pp. 1-9.

(56) References Cited

OTHER PUBLICATIONS

Office Communication for U.S. Appl. No. 16/262,790 dated Feb. 6, 2020, pp. 1-8.
Office Communication for U.S. Appl. No. 14/859,114 dated Mar. 13, 2020, pp. 1-21.
Office Communication for U.S. Appl. No. 16/752,451 dated Mar. 12, 2020, pp. 1-14.
Office Communication for U.S. Appl. No. 16/775,041 dated Mar. 11, 2020, pp. 1-8.
Office Communication for U.S. Appl. No. 16/779,362 dated Mar. 26, 2020, pp. 1-10.
Wikipedia clustered file system page from date Jul. 9, 2019, retrieved using the WayBackMachine, From https://web.archive.org/web/20190709083400/https://en.wikipedia.org/wiki/Clustered_file_system (Year: 2019), pp. 1-6.
Wikipedia raft page from date Jul. 16, 2019, retrieved using the WayBackMachine, from https://web.archive.org/web/20190716115001/https://en.wikipedia.org/wiki/Raft (computer_science) (Year: 2019), pp. 1-4.
Office Communication for U.S. Appl. No. 16/004,182 dated Mar. 23, 2020, pp. 1-4.
Office Communication for U.S. Appl. No. 16/752,509 dated Apr. 2, 2020, pp. 1-8.
Office Communication for U.S. Appl. No. 16/152,277 dated Apr. 3, 2020, pp. 1-10.
Office Communication for U.S. Appl. No. 16/004,182 dated Apr. 28, 2020, pp. 1-51.
Office Communication for U.S. Appl. No. 16/152,259 dated Apr. 29, 2020, pp. 1-19.
Office Communication for U.S. Appl. No. 14/859,114 dated Jun. 5, 2020, pp. 1-5.
Office Communication for U.S. Appl. No. 16/262,756 dated Jun. 8, 2020, pp. 1-22.
Office Communication for U.S. Appl. No. 14/595,598 dated Jul. 9, 2020, pp. 1-19.
Office Communication for U.S. Appl. No. 16/752,451 dated Jul. 23, 2020, pp. 1-8.
Office Communication for U.S. Appl. No. 14/859,114 dated Jul. 23, 2020, pp. 1-21.
Office Communication for U.S. Appl. No. 16/152,615 dated Aug. 6, 2020, pp. 1-7.
Office Communication for U.S. Appl. No. 16/779,362 dated Aug. 7, 2020, pp. 1-11.
Office Communication for U.S. Appl. No. 16/883,922 dated Aug. 7, 2020, pp. 1-13.
Office Communication for U.S. Appl. No. 16/775,041 dated Aug. 18, 2020, pp. 1-9.
Office Communication for U.S. Appl. No. 16/883,879 dated Sep. 1, 2020, pp. 1-11.
Extended European Search Report for European Patent Application No. 16812585.4 dated Nov. 7, 2018, pp. 1-9.
Comer, Douglas, "The Ubiquitous B-Tree," Computing Surveys, vol. 11, No. 2, Jun. 1979, Computer Science Department, Purdue University, West Lafayette, Indiana 47907, pp. 121-137.
Examination Report for European Patent Application No. 16812535.4 dated Jan. 2, 2020, pp. 1-6.
International Search Report and Written Opinion for International Patent Application No. PCT/US2016/038242 dated Oct. 11, 2016, pp. 1-11.
Office Communication for U.S. Appl. No. 14/595,598 dated Jul. 31, 2019, pp. 1-5.
Office Communication for U.S. Appl. No. 14/595,598 dated Sep. 20, 2018, pp. 1-18.
Office Communication for U.S. Appl. No. 14/595,598 dated Dec. 15, 2017, pp. 1-18.
Office Communication for U.S. Appl. No. 14/595,598 dated Feb. 24, 2017, pp. 1-8.
Office Communication for U.S. Appl. No. 14/595,598 dated Apr. 19, 2018, pp. 1-5.
Bloom, Burton H., "Space/Time Trade-offs in Hash Coding with Allowable Errors," Communications of the ACM, vol. 13, No. 7, Jul. 1970. Computer Usage Company, Newton Upper Falls, Massachusetts, pp. 422-426.
Office Communication for U.S. Appl. No. 16/262,756 dated Aug. 24, 2020, pp. 1-7.
Examination Report for European Patent Application No. 18155779.4 dated Oct. 8, 2019, pp. 1-4.
Office Communication for U.S. Appl. No. 16/152,259 dated Aug. 28, 2020, pp. 1-5.
Office Communication for U.S. Appl. No. 16/752,509 dated Aug. 11, 2020, pp. 1-7.
Office Communication for U.S. Appl. No. 14/595,598 dated Sep. 25, 2020, pp. 1-7.
Office Communication for U.S. Appl. No. 16/152,277 dated Oct. 16, 2020, pp. 1-10.
Office Communication for U.S. Appl. No. 16/152,615 dated Oct. 20, 2020, pp. 1-7.
Office Communication for U.S. Appl. No. 16/775,041 dated Nov. 3, 2020, pp. 1-5.
Office Communication for U.S. Appl. No. 17/062,500 dated Nov. 12, 2020, pp. 1-12.
Office Communication for U.S. Appl. No. 16/004,182 dated Nov. 30, 2020. pp. 1-55.
Office Communication for U.S. Appl. No. 14/859,114 dated Dec. 1, 2020, pp. 1-24.
Office Communication for U.S. Appl. No. 16/883,922 dated Dec. 2, 2020, pp. 1-9.
Office Communication for U.S. Appl. No. 16/883,879 dated Dec. 8, 2020, pp. 1-5.
Office Communication for U.S. Appl. No. 16/152,277 dated Dec. 23, 2020, pp. 1-5.
Office Communication for U.S. Appl. No. 16/004,182 dated Jan. 28, 2021, pp. 1-4.
Office Communication for U.S. Appl. No. 14/595,598 dated Feb. 4, 2021, pp. 1-19.
Office Communication for U.S. Appl. No. 17/115,529 dated Feb. 8, 2021, pp. 1-15.
Office Communication for U.S. Appl. No. 16/262,756 dated Feb. 10, 2021, pp. 1-19.
Office Communication for U.S. Appl. No. 17/114,384 dated Feb. 17, 2021, pp. 1-12.
Examination Report for European Patent Application No. 17206518.7 dated Feb. 23, 2021, pp. 1-6.
Office Communication for U.S. Appl. No. 14/859,114 dated Mar. 8, 2021, pp. 1-4.
Office Communication for U.S. Appl. No. 16/004,182 dated Mar. 8, 2021, pp. 1-60.
Office Communication for U.S. Appl. No. 17/062,500 dated Mar. 9, 2021, pp. 1-17.
Office Communication for U.S. Appl. No. 16/152,277 dated Mar. 18, 2021, pp. 1-10.
Office Communication for U.S. Appl. No. 17/160,698 dated Mar. 18, 2021, pp. 1-11.
Office Communication for U.S. Appl. No. 17/062,500 dated May 18, 2021, pp. 1-4.
Office Communication for U.S. Appl. No. 17/203,371 dated May 20, 2021, pp. 1-10.
Office Communication for U.S. Appl. No. 17/115,529 dated May 25, 2021, pp. 1-18.
Office Communication for U.S. Appl. No. 14/859,114 dated May 26, 2021, pp. 1-11.
Office Communication for U.S. Appl. No. 16/262,756 dated May 27, 2021, pp. 1-7.
Office Communication for U.S. Appl. No. 17/114,384 dated May 27, 2021, pp. 1-13.
Office Communication for U.S. Appl. No. 17/190,653 dated May 27, 2021, pp. 1-11.
Office Communication for U.S. Appl. No. 16/741,567 dated Jun. 8, 2021, pp. 1-5.
Office Communication for U.S. Appl. No. 17/203,452 dated Jun. 23, 2021, pp. 1-11.

(56) References Cited

OTHER PUBLICATIONS

Office Communication for U.S. Appl. No. 16/152,277 dated Jun. 25, 2021, pp. 1-10.
Office Communication for U.S. Appl. No. 16/004,182 dated Jul. 1, 2021, pp. 1-58.
Office Communication for U.S. Appl. No. 17/160,698 dated Jul. 2, 2021, pp. 1-12.
International Search Report and Written Opinion for International Patent Application No. PCT/US2021/023531 dated Jul. 6, 2021, pp. 1-7.
Office Communication for U.S. Appl. No. 17/062,500 dated Jul. 12, 2021, pp. 1-18.
Office Communication for U.S. Appl. No. 16/775,041 dated Jul. 21, 2021, pp. 1-11.
Office Communication for U.S. Appl. No. 17/114,384 dated Aug. 3, 2021, pp. 1-4.
Office Communication for U.S. Appl. No. 14/595,598 dated Aug. 6, 2021, pp. 1-20.
Office Communication for U.S. Appl. No. 17/115,529 dated Aug. 12, 2021, pp. 1-4.
Office Communication for U.S. Appl. No. 17/190,653 dated Aug. 27, 2021, pp. 1-11.
Office Communication for U.S. Appl. No. 17/114,334 dated Sep. 2, 2021, pp. 1-5.
Office Communication for U.S. Appl. No. 16/152,277 dated Sep. 3, 2021, pp. 1-4.
Office Communication for U.S. Appl. No. 16/004,182 dated Sep. 10, 2021, pp. 1-4.
Office Communication for U.S. Appl. No. 16/004,182 dated Sep. 29, 2021, pp. 1-11.
Office Communication for U.S. Appl. No. 16/152,277 dated Oct. 18, 2021, pp. 1-5.
International Search Report and Written Opinion for International Patent Application No. PCT/US2021/023525 dated Oct. 12, 2021, pp. 1-7.
Office Communication for U.S. Appl. No. 17/115,529 dated Oct. 22, 2021, pp. 1-20.
Office Communication for U.S. Appl. No. 17/062,500 dated Oct. 27, 2021, pp. 1-17.
Office Communication for U.S. Appl. No. 14/595,598 dated Oct. 28, 2021, pp. 1-6.
Office Communication for U.S. Appl. No. 16/741,567 dated Oct. 23, 2021, pp. 1-11.
Office Communication for U.S. Appl. No. 17/203,452 dated Nov. 2, 2021, pp. 1-13.
Office Communication for U.S. Appl. No. 17/190,653 dated Nov. 10, 2021, pp. 1-6.
Office Communication for U.S. Appl. No. 17/484,167 dated Nov. 18, 2021, pp. 1-15.
Office Communication for U.S. Appl. No. 16/231,354 dated Jul. 10, 2019, pp. 1-8.
Office Communication for U.S. Appl. No. 16/262,790 dated Apr. 18, 2019, pp. 1-14.
Office Communicationi for U.S. Appl. No. 16/004,182 dated Aug. 23, 2018, pp. 1-43.
Office Communication for U.S. Appl. No. 14/595,043 dated May 25, 2018, pp. 1-7.
Office Communicatioin for U.S. Appl. No. 15/854,447 dated May 6, 2019, pp. 1-9.
Office Communication for U.S. Appl. No. 16/262,756 dated Jan. 28, 2020, pp. 1-21.
Examination Report for European Patent Application No. 16812585.4 dated Jan. 2, 2020, pp. 1-6.
Office Communication for U.S. Appl. No. 16/152,277 dated Dec. 28, 2020, pp. 1-5.
Office Communication for U.S. Appl. No. 17/114,384 dated Sep. 2, 2021, pp. 1-5.
Office Communication for U.S. Appl. No. 16/741,567 dated Oct. 28, 2021, pp. 1-11.

* cited by examiner

MANAGING USABLE STORAGE SPACE IN DISTRIBUTED FILE SYSTEMS

TECHNICAL FIELD

The present invention relates generally to file systems, and more particularly, but not exclusively, to data storage for distributed file systems in cloud computing environments.

BACKGROUND

Modern computing often requires the collection, processing, or storage of very large data sets or file systems. Accordingly, to accommodate the capacity requirements as well as other requirements, such as, high availability, redundancy, latency/access considerations, or the like, modern file systems may be very large or distributed across multiple hosts, networks, or data centers, and so on. File systems may include many storage volumes that may be subject to failure. In some cases, file systems may be hosted or implemented in cloud computing environments. Conventionally, distributed file system may include various built-in tools for managing various file system data, such as, backups, replication, data archiving, versioning, and so on. Having a large number of storage volumes storing critical/important information increases the likelihood that a storage volume may fail or otherwise become unavailable. Accordingly, distributed file system may employ various parity or protection schemes to mitigate inevitable storage volume unavailability/failure. However, the large capacity and dynamic flexibility of distributed file system introduces various difficulties associated with maintaining protection/parity of data stored in file systems. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
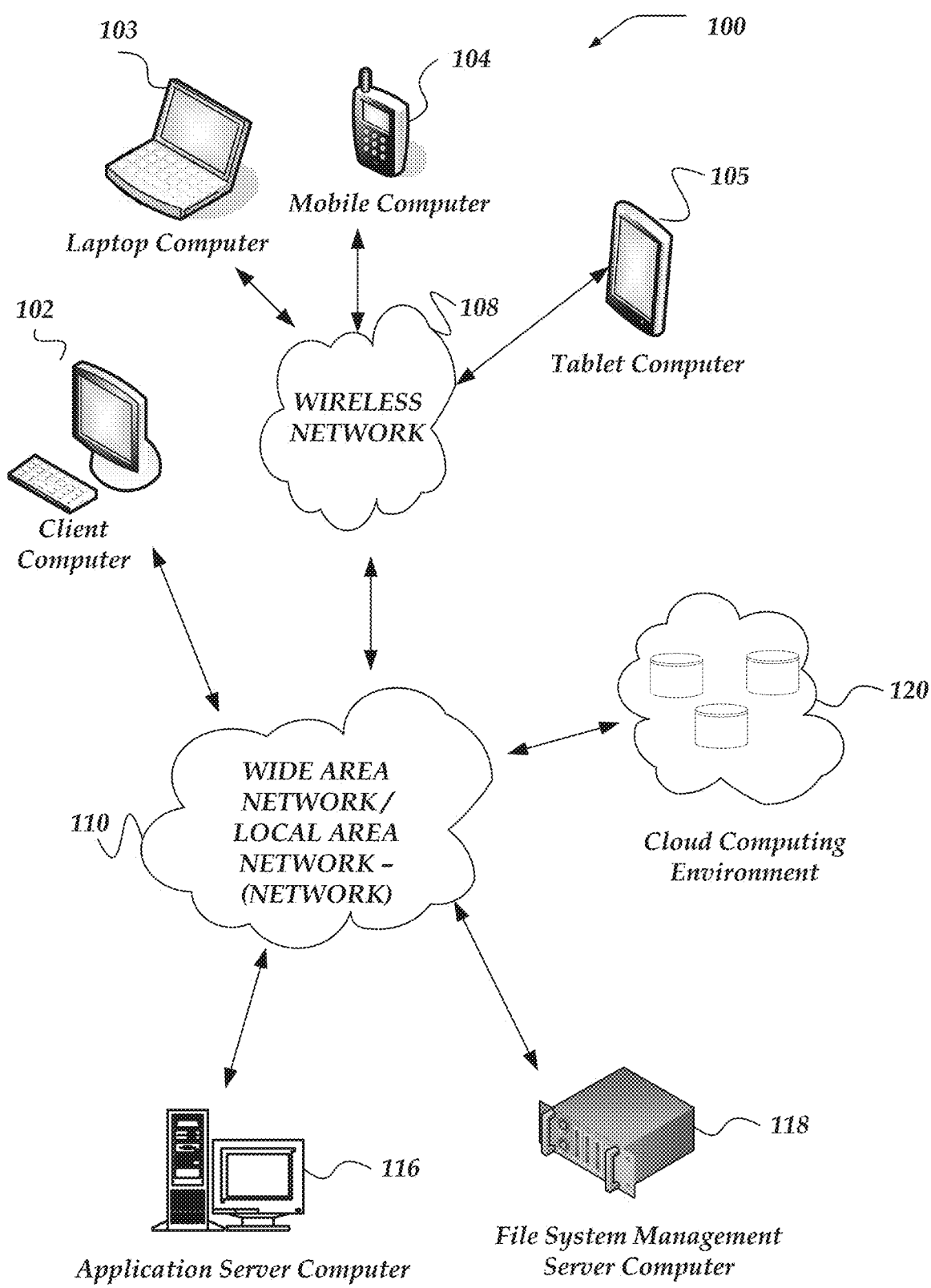
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft.NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein the terms "file system object" refers to entities stored in a file system. These may include files, directories, or the like. In this document for brevity and clarity all objects stored in a file system may be referred to as file system objects.

As used herein the terms "block," or "file system object block" refer to the file system data objects that comprise a file system object. For example, small sized file system objects, such as, directory objects or small files may be comprised of a single block. Whereas larger file system objects, such as large document files may be comprised of many blocks. Blocks usually are arranged to have a fixed size to simplify the management of a file system. This may include fixing blocks to a particular size, such as 4 KB, or the like, based on requirements associated with underlying storage hardware, such as, solid state drives (SSDs) or hard disk drives (HDDs), or the like. However, file system objects, such as, files may be of various sizes, comprised of the number of blocks necessary to represent or contain the entire file system object.

As used herein the term "storage volume" refers to virtualized data stores provided by cloud computing environments. Various attributes or features of storage volumes may vary depending on the cloud computing environment. However, in general, storage volumes may be considered to be logically similar to physical storage devices, such as, hard drives, solid state drives, network drives, or the like. Cloud computing environments provide APIs or other interfaces that enable programmatic provisioning of storage volumes. Also, among other things, cloud computing environment provide APIs or other interfaces that enable programmatic assignment/association of storage volumes with one or more virtualized network computers in the cloud computing environment.

As used herein the term "stripe" refers to logically contiguous portion of a data storage for a file system. In some cases, file systems may include more than one stripe. Also, in some cases, portions of stripes may be split across more than one storage volume or more than one storage node. Further, in some cases, a portion of the chunks in a stripe may be redundant to allow failure recovery, for example as in Reed-Solomon encodings. Thus, a stripe may be considered a logically contiguous portion of the data storage that may be mapped to portions of block storage including additional redundant chunks that aren't part of the logical data.

As used herein the term "chunk" refers to logically contiguous portions of a stripe such that a stripe may be comprised of many chunks. Chunk of a stripe may be distributed across multiple storage volumes or storage nodes in file system cluster.

As used herein the term "protection factor" refers to a value that defines the maximum number of chunks from the same stripe that may be stored/assigned to the same storage volume or storage node. In some cases, the protection factor for storage nodes may be a different value than the protection factor for storage volume. For example, the protection factor for storage volume may be set to one while the protection factor for individual storage nodes may be set to two. Thus, in this example, if a storage volume fails or becomes unavailable, no more than one chunk of data may be lost from affected stripes.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing data in a file system. In one or more of the various embodiments, the file system that includes one or more storage nodes that may be associated with one or more storage volumes may be provided such that the one or more storage volumes include two or more storage volume types that each may have a different capacity for storing data.

In one or more of the various embodiments, a file system storage capacity of the file system may be determined based on a number of stripes of data that fit in the file system such that each stripe may have a same stripe storage capacity and such that each stripe may comprise one or more chunks that have a same chunk storage capacity.

In one or more of the various embodiments, one or more slots in the file system may be determined based on the one or more storage volumes such that each slot may be a portion of the one or more storage volumes that matches the chunk storage capacity.

In one or more of the various embodiments, the one or more chunks may be assigned to the one or more slots in the file system based on a node storage capacity of the one or more storage nodes such that each chunk may be assigned to a storage node with a most amount of unassigned node storage capacity and such that a number of chunks allocated to a same storage volume or a same storage node may be based on protection factor information.

In one or more of the various embodiments, the file system may be employed to store data that is distributed to the one or more chunks.

In one or more of the various embodiments, assigning the one or more chunks to the one or more slots may further include: determining a first number of chunks from a same stripe to assign to the storage volume based on the protection factor information; and determining a second number of chunks from the same stripe to assign to the storage node based on the protection factor information.

In one or more of the various embodiments, assigning the one or more chunks to the one or more slots may further include: determining a stripe that includes one or more unassigned chunks; determining an unassigned chunk from the stripe based on a position of the unassigned chunk in the stripe such that the unassigned chunk may be a nearest unassigned chunk to a beginning of the stripe; determining the storage volume having a greatest unassigned capacity that conforms to one or more constraints provided by the protection factor information; and assigning the unassigned chunk to an empty slot in the storage volume.

In one or more of the various embodiments, determining the file system storage capacity based on the number of stripes of data that fit in the file system may include: determining a maximum stripe width based on the one or more storage nodes, the one or more storage volumes, and the protection information; and in response to a count of the one or more chunks in a stripe being less than or equal to the maximum stripe width, performing further actions, including: determining a current total capacity value based on a sum of each node storage capacity of each storage node; initializing a best stripe count value based on the total capacity value divided by the count of the one or more chunks in the stripe; initializing a temporary stripe width value based on the maximum stripe width; iterating over each storage node in descending node storage capacity, performing further actions, including: updating the current total capacity value by subtracting a capacity of a currently visited storage node from the current total capacity value;

updating the temporary stripe width value by subtracting a protection factor associated with a currently visited storage node such that the protection factor is included in the protection information; in response the updated count of stripe storage buckets being less than one, stopping the iteration over the storage nodes and providing the current best stripe count as the number of stripes of data that fit in the file system; and in response to the updated count of stripe storage buckets being greater than or equal to one, performing further actions, including: determining a candidate stripe count by dividing the updated temporary stripe width value; and in response to the updated candidate stripe count being less than the best stripe count, updating the best stripe count to be the updated candidate stripe count.

In one or more of the various embodiments, one or more evaluation sets that include two or more storage volume types may be determined. In one or more of the various embodiments, a least node storage capacity may be determined for the one or more storage nodes that includes two or more storage volumes that match the two or more storage volume types included in the one or more evaluation sets. And, in one or more of the various embodiments, a spare file system storage capacity for the file system may be determined based on omitting one or more of the two or more storage volumes from the storage node having the least node storage capacity.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, application server computer 116, file system management server computer 118, cloud computing environment 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, file system management server computer 118, cloud computing environment 120, or other computers.

Client computers 102-105 may further be configured to include a client application that enables an end-user to log into an end-user account that may be managed by another computer, such as application server computer 116, file system management server computer 118, cloud computing environment 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by application server computer 116, file system management server computer 118, cloud computing environment 120, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, file system management server computer 118, cloud computing environment 120, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

In some embodiments, cloud computing environment 120 may be one or more public or private cloud computing environments. In some embodiments, cloud computing environments may be provided by various vendors or developed internally or privately. Cloud computing environments typically provide virtualized network computers (e.g., compute instances), virtualized storage (e.g., storage volumes), virtualized network interfaces, or the like. Various cloud computing environments may be assumed to have one or more APIs or interfaces that enable users or services to provision resources, provision storage, configure networking, monitoring usage/status, or the like. One of ordinary skill in the art will be well acquainted with public or private cloud computing environments.

Also, one embodiment of file system management server computer 118 is described in more detail below in conjunction with FIG. 3. Although FIG. 1 illustrates file system management server computer 118, or the like, as a single computer, the innovations or embodiments described herein are not so limited. For example, one or more functions of file system management server computer 118, or the like, may be distributed across one or more distinct network computers. Moreover, in one or more embodiments, file system management server computer 118 may be implemented using a plurality of network computers. Further, in one or more of the various embodiments, file system management server computer 118, or the like, may be implemented using one or more cloud instances in one or more cloud networks, such as, cloud computing environment 120. Accordingly, these innovations and embodiments are not to be construed as being limited to a single environment, and other configurations, and other architectures are also envisaged.

Illustrative Client Computer

Figure 2:
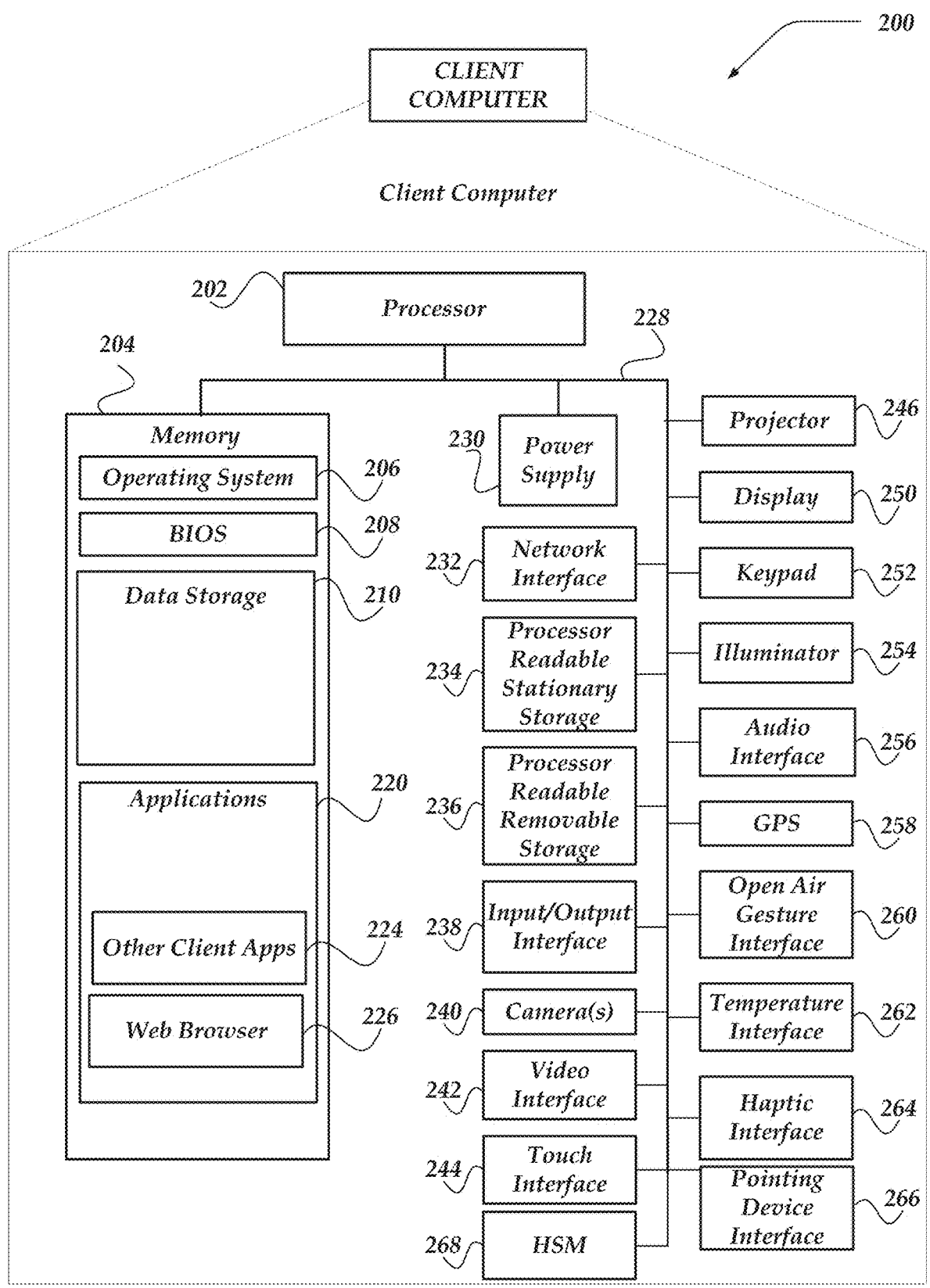
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, 5G, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or Linux®, or a specialized client computer communication operating system such as Windows Phone™, or the Apple Corporation's iOS or macOS® operating systems. The operating system may include, or interface various runtime engines, including Java virtual machines, or the like, that may enable control of hardware components or operating system operations via application programs supported by the various runtime engines.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include other client applications 224, web browser 226, or the like. Client computers may be arranged to exchange communications one or more servers or one or more other client computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
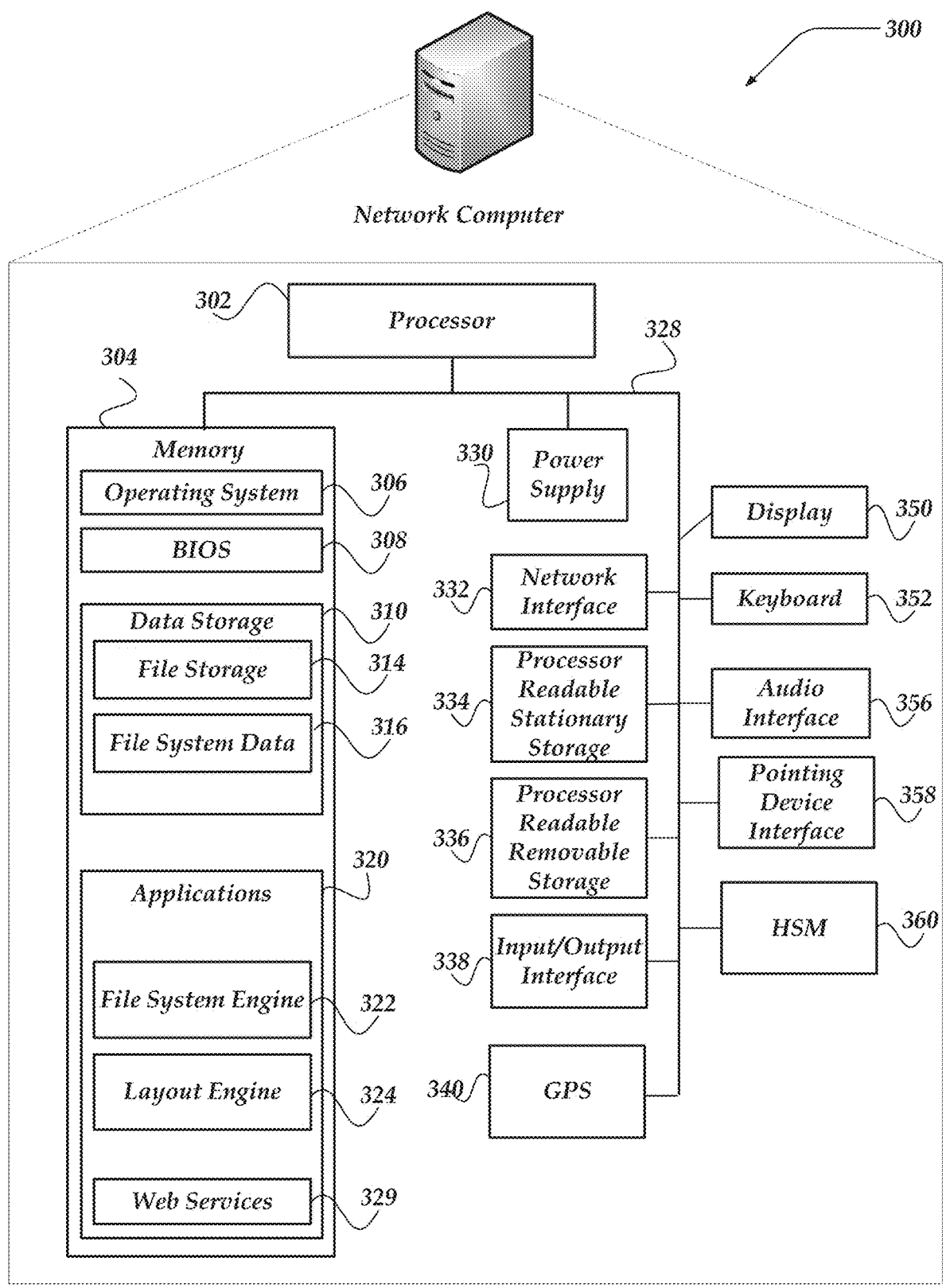
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one or more embodiments of a file system management server computer such as file system management server computer 118, or the like, of FIG. 1. Also, in some embodiments, network computer 300 may represent virtualized network computers in cloud computing environments, or the like.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), 5G, or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, file system engine 322, layout engine 324, web services 329, or the like, may be arranged to employ geo-location information to select one or more localization features, such as, time zones, languages, currencies, currency formatting, calendar formatting, or the like. Localization features may be used in user interfaces, dashboards, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's macOS® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, friend lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, file storage 314, file system data 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include file system engine 322, layout engine 324, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, file system engine 322, layout engine 324, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to file system engine 322, layout engine 324, web services 329, or the like, may be provisioned and de-commissioned automatically.

Also, in one or more of the various embodiments, file system engine 322, layout engine 324, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
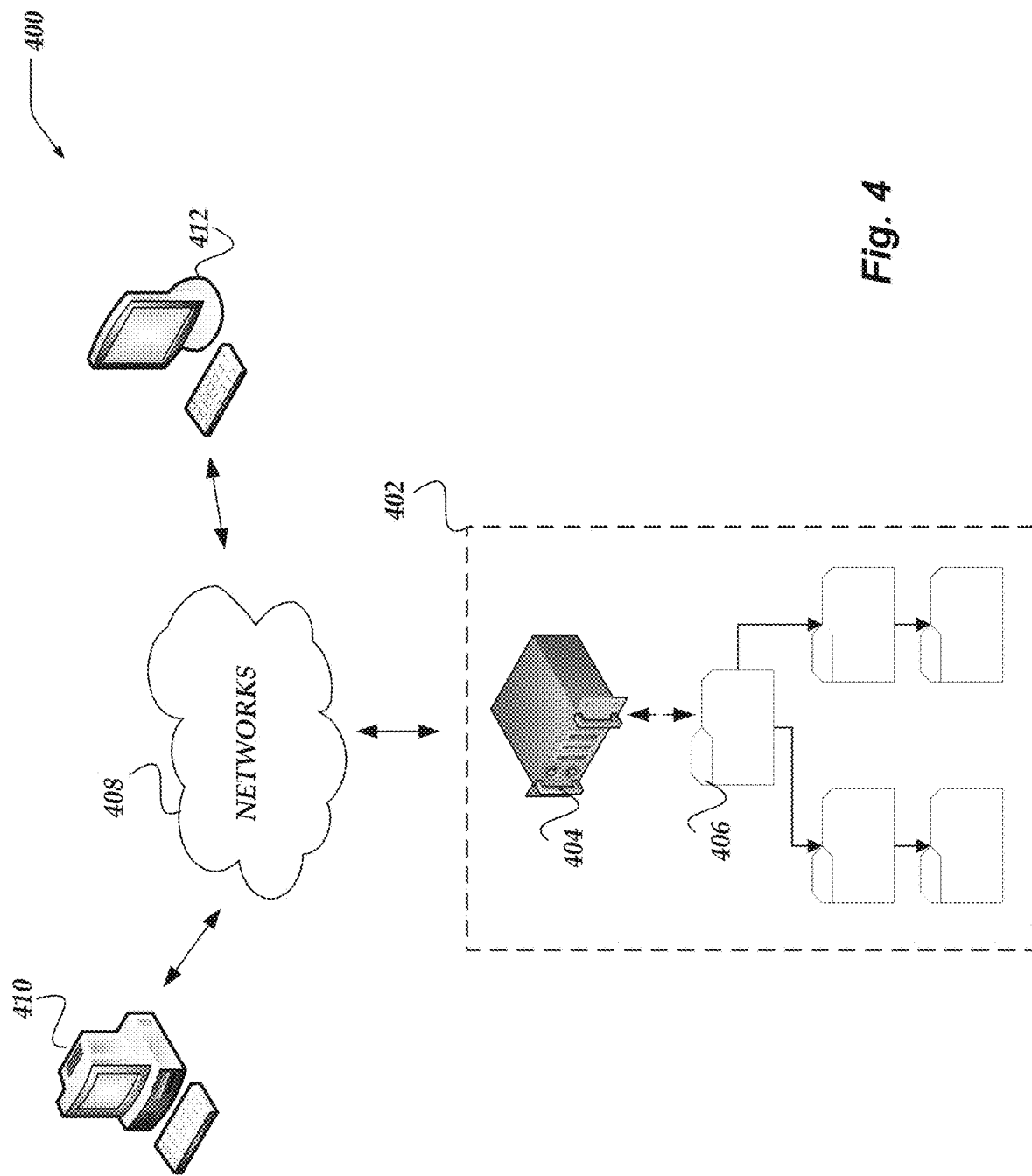
FIG. 4 illustrates a logical architecture of a system for managing usable storage space in distributed file systems in accordance with one or more of the various embodiments.

FIG. 4 illustrates a logical architecture of system 400 for managing usable storage space in distributed file systems in accordance with one or more of the various embodiments. In one or more of the various embodiments, one or more file systems, such as, file system 402 may be arranged to be communicatively coupled to one or more networks, such as, networks 408. Accordingly, in one or more of the various embodiments, one or more clients, such as, client computer 410 or client computer 412 may be arranged to access file system 402 over networks 408. In some embodiments, clients of file system 402 may include users, services, programs, computers, devices, or the like, that may be enabled to perform one or more data related operations, such as, creating, reading, updating, or deleting data (e.g., file system objects, documents, or the like) that may be stored in file system 402.

In some embodiments, file system 402 may comprise one or more file system management computers, such as file system management computer 404. Also, in one or more of the various embodiments, file systems, such as file system 402 may include one or more file system objects, such as file system object 406. In one or more of the various embodiments, file system object 406 may be considered to represent the various file system objects, documents objects, or the like, that may be stored in file system 402. In some embodiments, file system objects may include, files, documents, directories, folders, backups, snapshots, replication snapshots, replication information, or the like.

In one or more of the various embodiments, the implementation details that enable file system 402 to provide file system services may be hidden from clients, such that they may be arranged to use file system 402 the same way they use other conventional local or remote file systems. Accordingly, in one or more of the various embodiments, clients may be unaware that they are using a distributed file system that supports replicating files in distributed file systems using object-based data storage because file system engines or replication engines may be arranged to mimic the interface or behavior of one or more conventional file systems.

Also, while file system 402 is illustrated as using one file system management computer with one set of file system objects, these innovations are not so limited. Innovations herein contemplate file systems that may include one or more file system management computers or one or more file system object data stores. In some embodiments, file system objects may be located remotely from one or more file system management computers. Also, a logical file system object store or file system may be spread across two or more cloud computing environments, storage clusters, or the like.

Figure 5:
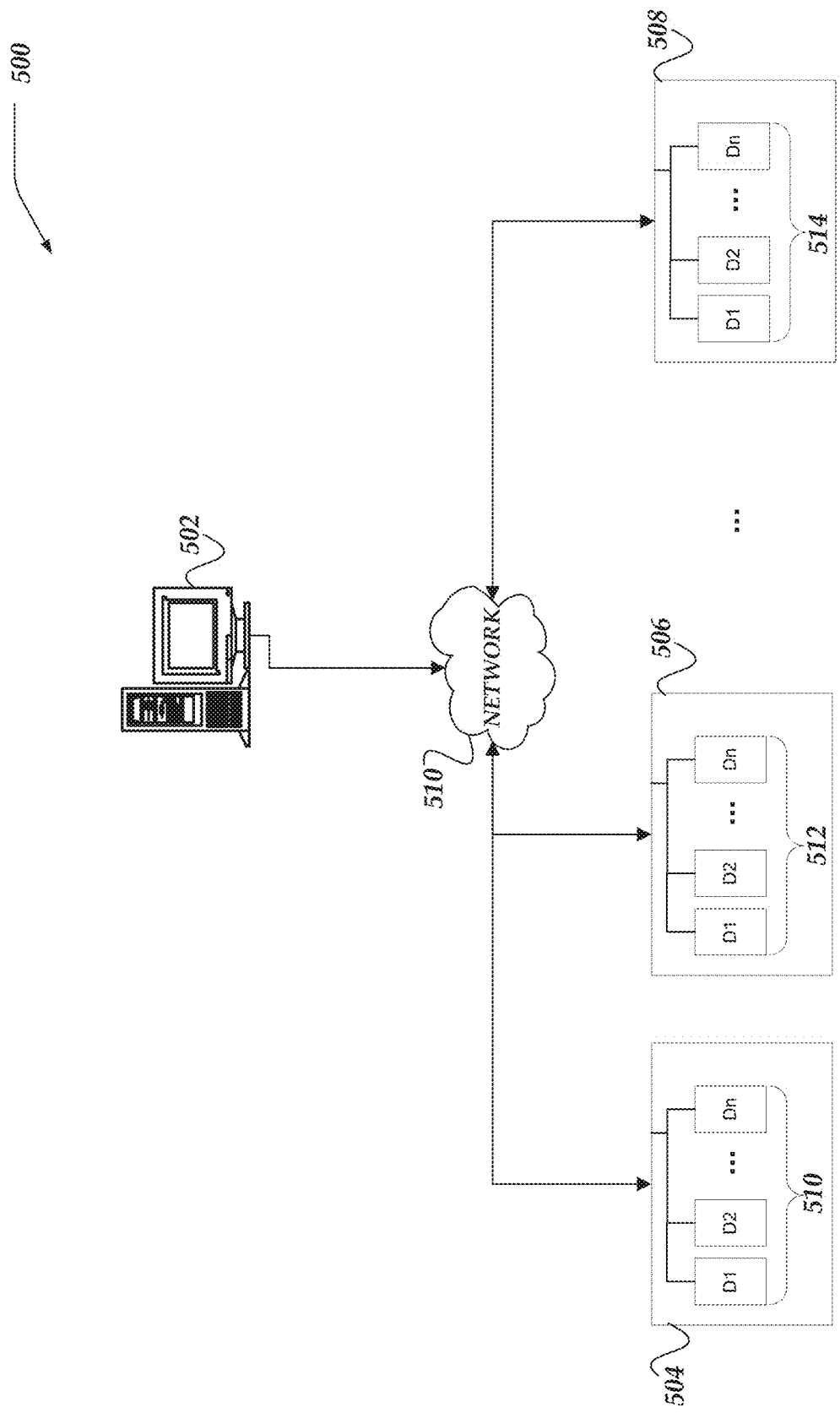
FIG. 5 shows a system that is a portion of a data storage system for managing usable storage space in distributed file systems in accordance with at least one of the various embodiments.

FIG. 5 shows system 500 that is a portion of a data storage system for managing usable storage space in distributed file systems in accordance with at least one of the various embodiments. In at least one of the various embodiments, system 500 may be comprised of a file system management server computer, such as, file system management server computer 502, as well as, one or more storage computers, such as, storage node 504, storage node 506, storage node 508, or the like. In at least one of the various embodiments, file system management server computer 502, storage node 504, storage node 506, or storage node 508, may be comprised of network computers, similar to network computer 300.

In at least one of the various embodiments, each storage node may be interconnected over a network, such as, network 510. In at least one of the various embodiments, network 510 may be comprised similarly as wireless network 108 or network 110.

In at least one of the various embodiments, the storage nodes may be arranged to include one or more storage volumes, such as, storage volumes 510, storage volumes 512, or storage volumes 514. In various embodiments, storage nodes may include more or fewer storage volumes than illustrated in FIG. 5. In at least one of the various embodiments, storage nodes may include a single storage volume. And, in some embodiments, one or more storage nodes may be arranged to be included in an enclosure or chassis which in turn may be interconnected to other computer or storage nodes over network 510.

In one or more of the various embodiments, storage volumes may be comprised of one or more physical storage devices, such as, hard disk drives (HDDs), solid state drives (SSDs) or the like.

In one or more of the various embodiments, one or more storage volumes may be comprised virtualized storage objects provided by a cloud computing environment.

In at least one of the various embodiments, the functionality of file system management server computer 502 may be incorporated directly into one or more storage nodes, such as, storage node 504, storage node 506, storage node 508, or the like. In such embodiments a file system management application, such as, file system engine 322 or layout engine 324 may be operative on one or more of the storage nodes. Further, in at least one of the various embodiments, some or all functionality of the file system management server computer may be implemented directly on each storage node.

Further, in at least one of the various embodiments, file system management server computer 502 may be arranged to manage one or more distributed tasks of varying types that may be executed on the file system. In at least one of the various embodiments, task types may include, repair tasks, erasure coding (e.g., encoding and decoding) tasks, distributed data writes, cryptographic tasks, compression tasks, decompression tasks, arbitrary compute tasks, or the like.

Figure 6:
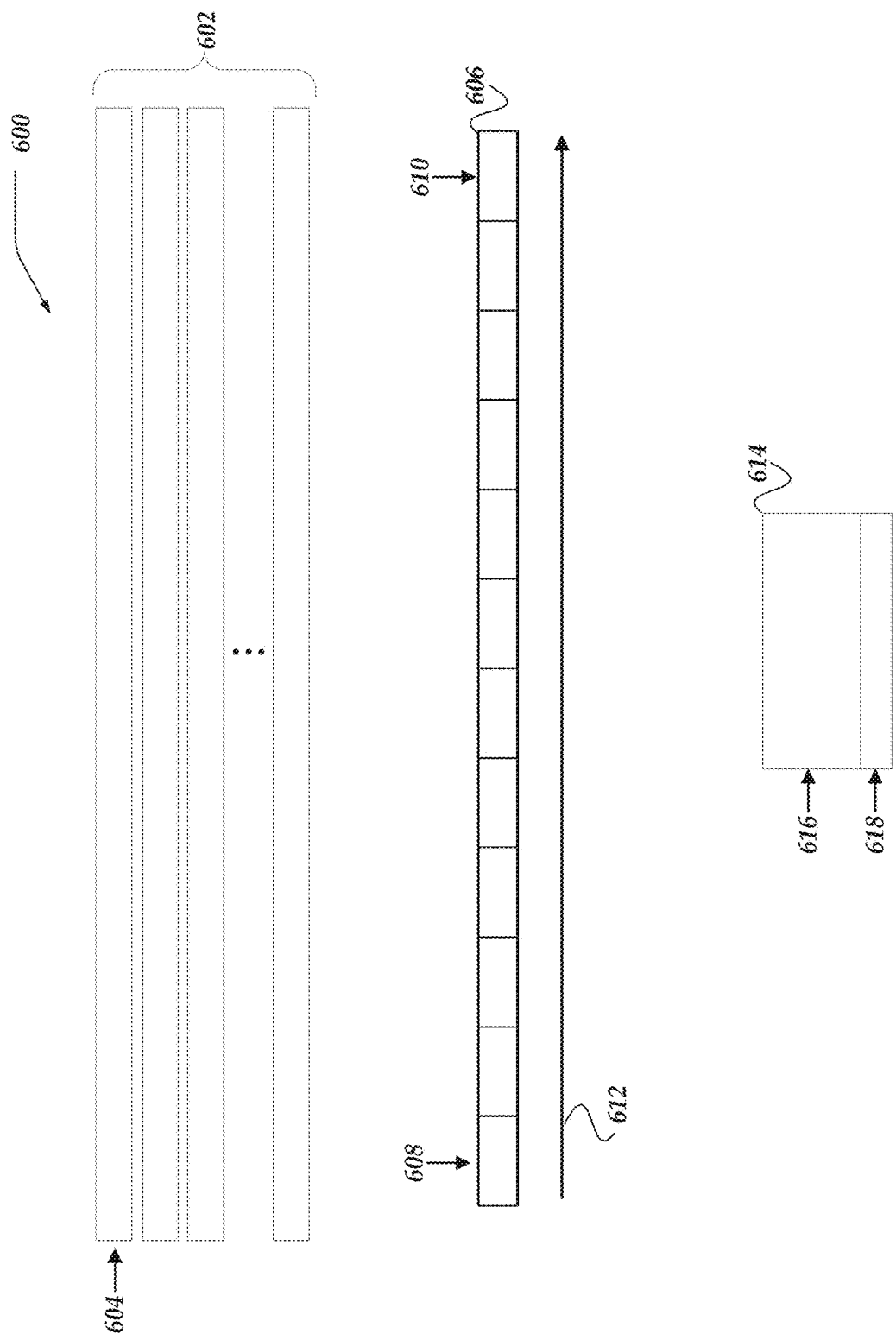
FIG. 6 illustrates a logical schematic of a file system for managing usable storage space in distributed file systems in distributed file systems in accordance with one or more of the various embodiments.

FIG. 6 illustrates a logical schematic of file system 600 for managing usable storage space in distributed file systems in distributed file systems in accordance with one or more of the various embodiments. In some embodiments, file systems, such as, file system 600 may be arranged to organize storage space using one or more stripes, such as, stripes 602. In some embodiments, each stripe in a file system represents a relatively large portion of the available storage. For example, a 1000 TB file system may be comprised of ten 100 TB stripes. In this example, stripe 604 represents a single stripe in file system 600. In some embodiments, the actual storage for each stripe may be spread across multiple storage nodes, multiple storage volumes, and multiple storage devices.

Further, in some embodiments, each stripe may be divided into multiple chunks, each representing a portion of the stripe. In this example, stripe 606 represents a single stripe in a file system and chunk 608 represents a chunk of stripe 604. In some embodiments, the file system may be arranged to maintain a logical address space such that chunk 608 represents the beginning portion of the address space that corresponds to storage space that is usable by clients of the file system. And, in this example, for some embodiments, chunk 610 represents a portion of the address space that is towards the end of usable storage in stripe 606. Thus, in this example, arrow 612 illustrates the range address space for stripe 606 starting from an initial storage address to a terminal storage address.

In one or more of the various embodiments, stripes provided by file systems may be comprised of chunks, such as, as chunk 614. In this example, chunk 614 represents one or more chunks such as chunk 608, chunk 610, or the like.

In one or more of the various embodiments, chunks may represent a fixed size that is configured to be significantly smaller that an individual storage volume or storage device. For example, if a file system includes 4 TB HDDs, the size of chunks for that file system may be 10 GB. In some embodiments, a portion of chunks may be reserved for parity (e.g., erasure coding information) with the remained available for storing user data. In this example, chunk portion 616 may be considered storage capacity available to users while chunk portion 618 may be considered data storage capacity for parity information or other meta-data required to operation the distributed file system. Alternatively, in some embodiments, entire chunks (not shown) may be reserved for parity information or other meta-data.

Further, one of ordinary skill in the art will appreciate that chunks may be comprised of smaller underlying blocks/sectors provided by storage volumes or storage devices. These innovations assume that storage volumes or storage devices may provide low level configuration that may be transparent to the file system engine or layout engines.

Figure 7:
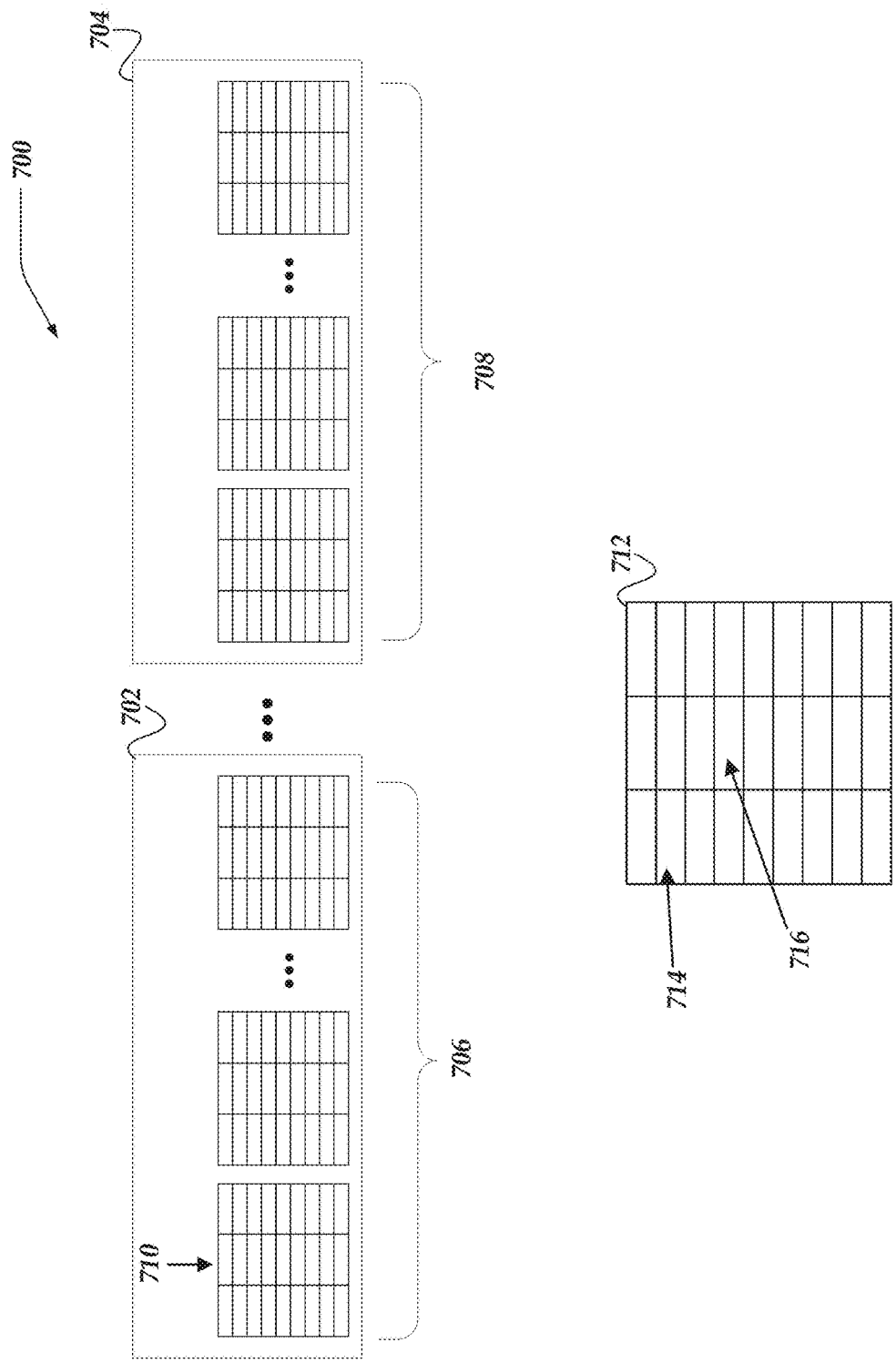
FIG. 7 illustrates a logical schematic of a file system for managing usable storage space in distributed file systems in distributed file systems in accordance with one or more of the various embodiments.

FIG. 7 illustrates a logical schematic of file system 700 for managing usable storage space in distributed file systems in distributed file systems in accordance with one or more of the various embodiments. As described above, in some embodiments, storage capacity of file system may be logically organized into stripes comprised of chunks. In some embodiments, file system may be arranged to employ layout engines to distribute chunks across storage volumes in the file system. In some embodiments, layout engines may be arranged to assign chunks from different stripes to the same storage volume or storage node.

In this example, for some embodiments, storage node 702 and storage node 704 represent two storage nodes in file system 700. One of ordinary skill in the art will appreciate that file systems, such as, file system 700 may be comprised of multiple storage nodes rather than being limited to two nodes as illustrated here. Further, in this example, storage devices 706 and storage devices 708 represent storage devices that may be associated with storage node 702 and storage node 704 respectively.

In this example, for some embodiments, each storage device (e.g., storage device 710) is illustrated as being organized into regular blocks or slots. These may be considered to represent slots that may store chunks that correspond to the stripes that makes up the file system. Accordingly, in this example, for some embodiments, storage device 712 may be considered to represent a storage device that is logically divided into slots for storing chunks. Thus, in this example, slot 714 and slot 716 may be considered slots for storing chunks associated with a stripe.

In one or more of the various embodiments, file systems may be arranged to configured to restrict the number of chunks from the same stripe from being on the same storage node or the same storage device. In some embodiments, these restrictions (e.g., protection factors) may be adjusted to reflect one or more requirements of the file system, such as protection level, time for rebuilding the file system or data recovery, or the like.

One of ordinary skill in the art will appreciate that protection level refers to the number of storage units that may fail without losing data. For example, a file system configured to have two levels of protection may be able to recover/restore data that was stored on the two failed storage units. However, in this example, if more than two storage units fail, data may be irrevocably lost. In some embodiments, file systems employ various encoding schemes to enable data recovery. Typically, conventional or customized encoding schemes store information encoded for recovering other failed storage units in storage units or portions of storage units reserved for storing storage encoding information. For example, a file system with 10 storage units total may reserve two storage units for storing encoded protection information while leaving eight storage units for storing user data. In this example, if two or less storage units of the original ten fail, the erasure encoding scheme enable all the user data or encoding data to be recovered from the remaining eight storage units. In contrast, in this example, if three or more storage units failed some of the user data or encoding data will be unrecoverable.

In file systems, such as, file system 700 storage volumes or storage nodes could fail. If a storage node fails all the storage volumes associated with the failed storage node may become unavailable. Likewise, if a storage volume fails the information on the failed storage volume may become unavailable. Accordingly, a conventional file system comprised of ten storage nodes may provide eight storage nodes for storing user data and two storage nodes for storing protection data (e.g., encoded protection/parity information). Accordingly, in this example, if two or the storage node fail, the entire file system may be rebuilt from the remaining eight storage nodes. If a storage unit fails, file systems are often configured to immediately begin recovering operations by replacing the failed storage units and regenerating the lost data from the remain storage units. However, as the size of file systems increase, the time it takes for recovering a file system from failed storage units similarly increases.

Accordingly, in some embodiments, file systems may be arranged to layout data using stripes comprised of chunks such that the number of chunks from the same stripe on the same node and same storage volume may be restricted depending on the protect level requirements. For example, if a stripe may be configured to have a protection level of two, two chunks of the same stripe may be lost before user data is threatened. Thus, in this example, if file system restricts the number of chunks for a stripe stored on single node to two or less, then stripes may be recovered if a node fails because each stripe will lose just no more than two chunks if a node fails. In contrast, in this example, if three nodes fail, one or more stripes may lose more than two chunks and be unrecoverable.

Likewise, in some embodiments, file systems may restrict the number of chunks from a single stripe that may be stored on the same storage volume depending on the desired/configured protection level of the file system. For example, if a file system is configured to have level two protection, up to two chunks may be lost before data in a stripe becomes unrecoverable. Thus, if two chunks of the same stripe are stored on the same storage volume, the failure of that storage volume may put the remainder of the stripe in jeopardy because losing one more chunk of the stripe may cause irrevocable data loss. In contrast, if the file system is configured to restrict multiple (more than one) chunk from being stored on the same storage volume, the failure of one storage volume will consume one protection level leaving 'breathing space' that may enable recovery operations to complete before the occurrence of another failure that may cause irrevocable data loss.

Further, in one or more of the various embodiments, distributing chunks from multiple stripes across different storage nodes or storage volumes enables failure recovery or other layout operations to be conducted in parallel. Accordingly, in some embodiments, the time it takes to recover/restore an entire stripe may be reduced because chunks may be accessed simultaneously from multiple storage nodes or storage volumes. Thus, in some embodiments, computing resources and network bandwidth required for restoring/recovering large stripes may be spread across multiple computers and multiple network interfaces.

In one or more of the various embodiments, file systems may be configured to restrict the number of chunks from the same stripe that may be stored on the same storage node. Likewise, in some embodiments, file systems may be arranged to restrict the number of chunks from the same stripe that may be stored on the same storage volume. For example, a file system may be configured enable a maximum of two chunks from the same stripe to be stored on a storage node and enables a maximum of one chunk from the same stripe to be stored on the same storage volume.

Accordingly, in one or more of the various embodiments, file system layout engines may be arranged to distribute chunks across storage nodes or storage volumes such that the protection factor restrictions may be observed.

Also, in one or more of the various embodiments, layout engines may be arranged to determine capacity information of a file system based on how the stripes may be laid out. In some embodiments, stripe chunk layout may be complicated if storage nodes or storage volumes have different capacities. Accordingly, in some embodiments, as described in more detail below, layout engines may be arranged to determine capacity information such that protection factors and varying storage capacities may be accounted for.

Also, in one or more of the various embodiments, layout engines may be arranged to sparing capacity for a file system. Sparing capacity may a defined capacity to store information that was stored on failed/lost storage volumes or storage nodes. Thus, in some cases, file system engine may recover and re-protect from failures without having to add new/replacement storage volume or storage node because sparing capacity may be already included in the file system.

Accordingly, in some embodiments, layout engines may be arranged to compute a capacity for each storage volume type based on omitting one or more storage volumes of that same storage volume type from the storage nodes with the smallest storage capacity based on storage volumes of that same storage volume. type. In some cases, multiple storage nodes may be omitted from consideration if the number of storage volumes being omitted may be greater than the capacity of the storage node with the least overall capacity. Then layout engines may repeat the analysis for each storage volume type and take the smallest capacity to determine a sparing capacity for the file system.

Generalized Operations

FIGS. 8-13 represent generalized operations for managing usable storage space in distributed file systems in accordance with one or more of the various embodiments. In one or more of the various embodiments, processes 800, 900, 1000, 1100, 1200, and 1300 described in conjunction with FIGS. 8-13 may be implemented by or executed by one or more processors on a single network computer, such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-12 may perform actions for managing usable storage space in distributed file systems in accordance with at least one of the various embodiments or architectures such as those described in conjunction with FIGS. 4-7. Further, in one or more of the various embodiments, some or all of the actions performed by processes 800, 900, 1000, 1100, 1200, and 1300 may be executed in part by file system engine 322, or layout engine 324.

Figure 8:
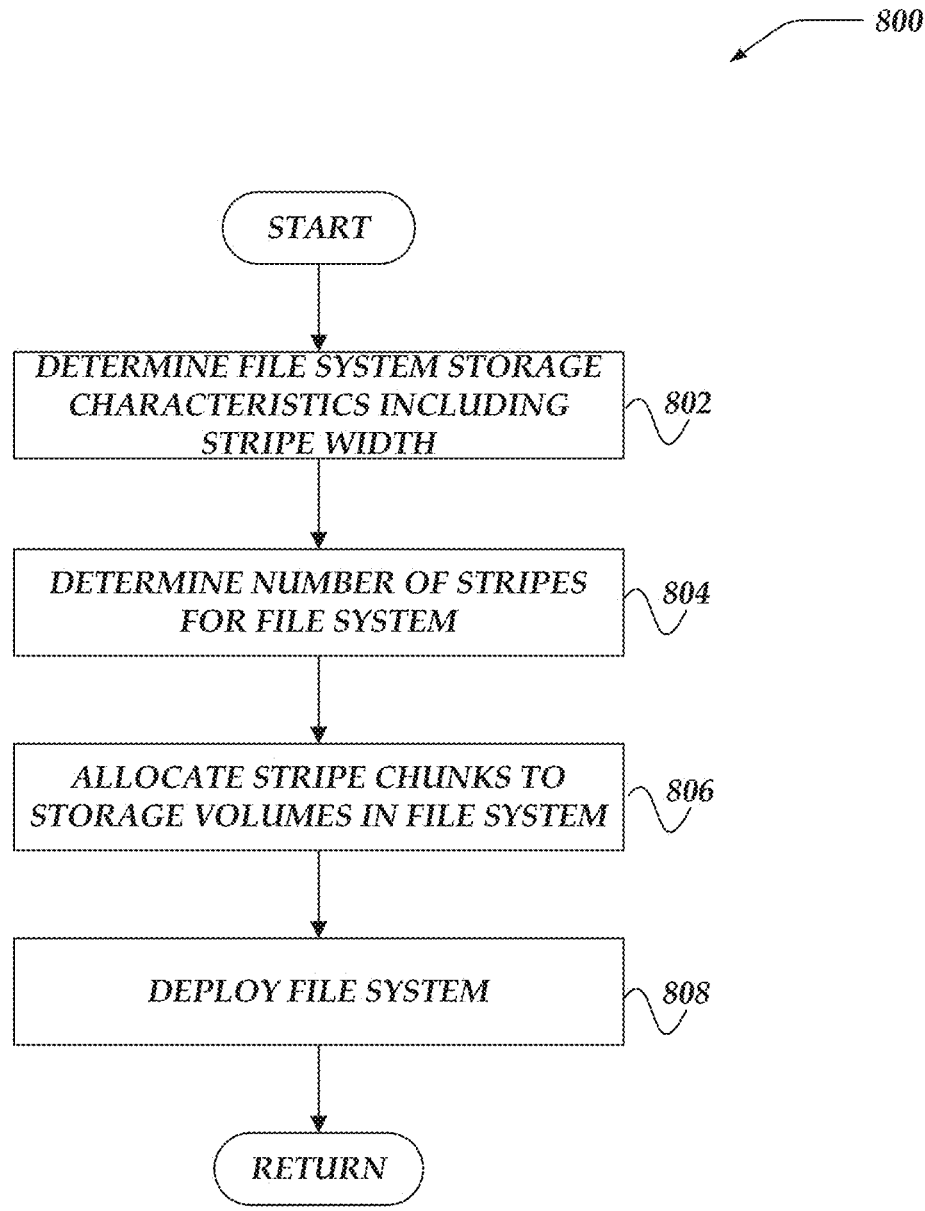
FIG. 8 illustrates an overview flowchart for a process for managing usable storage space in distributed file systems in accordance with one or more of the various embodiments.

FIG. 8 illustrates an overview flowchart for process 800 for managing usable storage space in distributed file systems in accordance with one or more of the various embodiments. After a start flowchart block, at flowchart block 802, in one or more of the various embodiments, file system engines or layout engines may be arranged to determine one or more file system storage characteristics including a stripe width for the file system.

In one or more of the various embodiments, file systems may be designed to meet a variety of local requirements for various local circumstances. Accordingly, in some cases, for some embodiments, the number of storage nodes, storage volumes, stripe width, or the like, may selected based on various factors such as capacity needs, work load, number of clients, types of storage applications (e.g., video streaming, document storage, databases, or the like), or the like.

In some embodiments, determining the performance characteristics of a file system may be an iterative process such that users/administrators may continually update/modify file system characteristics overtime in view of local circumstances or local requirements.

Other components, such as, network topology, network interfaces, network bandwidth, may also impact or drive the selection of file system characteristics.

Accordingly, in one or more of the various embodiments, file system engines or layout engines may be provided components and configuration information for the file system.

Also, in one or more of the various embodiments, stripe width for the file system may be provided. In some embodiments, stripe width represents the storage capacity of each stripe in the file system.

At flowchart block 804, in one or more of the various embodiments, layout engines may be arranged to determine the number of stripes for the file system. In one or more of the various embodiments, layout engines may be arranged to evaluate the file system characteristics in view of the desired stripe width to determine how many stripes may be allocated in the file system. In one or more of the various embodiments, layout engines may be arranged to enforce protection factor rules that may restrict the number of chunks of a same stripe that may be allocated to each storage node or storage volume.

In one or more of the various embodiments, determining the number of stripes that may fit on the file system components enables the total capacity of the file system to be determined. For example, if stripe width is 10 TB and 100 stripes can fit in a file system, file system capacity is 10 TB×100=1000 TB At flowchart block 806, in one or more of the various embodiments, layout engines may be arranged to allocate stripe chunks to storage volumes in the file system. In one or more of the various embodiments, layout engines may be arranged to determine a capacity/size of the chunks that comprise stripes based on configuration information. For example, chunk capacity for a file system may be defined to be 10 GB. Thus, in this example, a storage volume with 4 TB capacity would have 400 slots for allocating chunks.

In one or more of the various embodiments, layout engines may be arranged to allocate chunks of each stripe in the file system to storage nodes and storage volumes such that they conform to protection factor rules that may be established for the file system.

At flowchart block 808, in one or more of the various embodiments, file system engines may be arranged to deploy the file system. In one or more of the various embodiments, if the chunks of the stripes have been allocated to storage nodes or storage volumes, the file system may be considered ready to service file system activity such as responding to client requests, executing backups/replications, or the like.

Next, in one or more of the various embodiments, control may be returned to a calling process.

Figure 9:
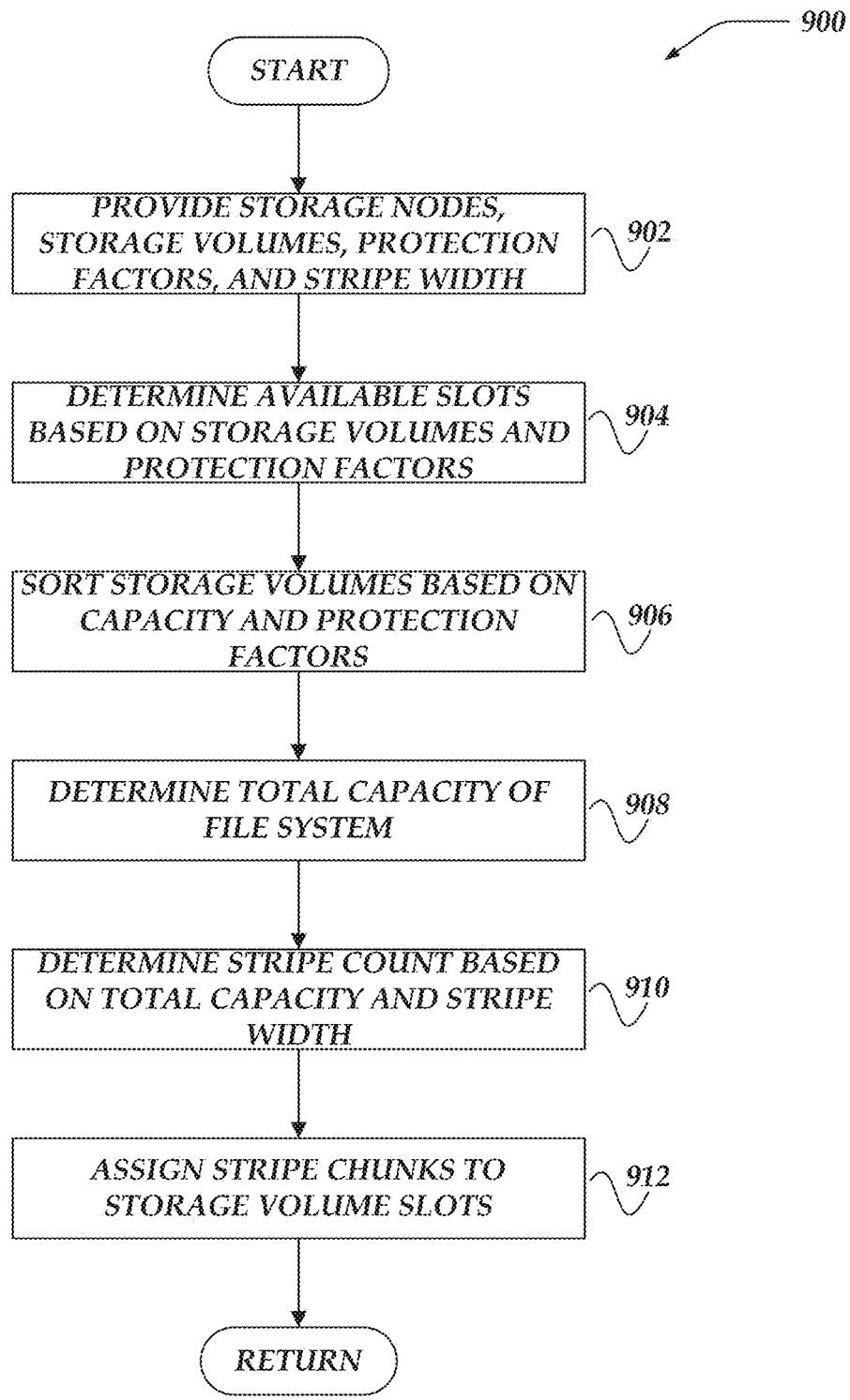
FIG. 9 illustrates a flowchart for a process for managing usable storage space in distributed file systems in accordance with one or more of the various embodiments.

FIG. 9 illustrates a flowchart for process 900 for managing usable storage space in distributed file systems in accordance with one or more of the various embodiments. After a start flowchart block, at flowchart block 902, in one or more of the various embodiments, storage nodes, storage volumes, protection factor information, stripe width information, or the like, may be provided for a file system. As described above, layout engines may be provided file system configuration information and access to the storage nodes assigned to the file system.

At flowchart block 904, in one or more of the various embodiments, layout engines may be arranged to determine the available slots based on the storage volume and protection factor information.

At flowchart block 906, in one or more of the various embodiments, layout engines may be arranged to sort the storage volumes based on capacity and protection factors. In one or more of the various embodiments, storage volumes may have different/various capacity. Accordingly, in some embodiments, different storage nodes may be associated with different sized storage volumes (e.g., different sized HDDs, or the like).

In one or more of the various embodiments, layout engines may be arranged to prepare for allocating stripe chunks to storage volumes by first sorting the storage volumes based on capacity. Note, in some embodiments, layout engines may be arranged to generate data structures or indices to logically sort the storage volumes rather that requiring physical interaction with storage nodes or storage volumes.

At flowchart block 908, in one or more of the various embodiments, layout engines may be arranged to determine the total capacity of the file system. In some embodiments, layout engines may be arranged to determine file system capacity based on the number of storage nodes and storage volumes.

At flowchart block 910, in one or more of the various embodiments, layout engines may be arranged to determine the number of stripes for the file system based on the capacity of the file system and stripe width.

In one or more of the various embodiments, stripe width may be considered a provided or configured value, however, determining the number of stripes that may fit into a given configuration of the storage nodes, storage volumes, or the like, comprising the file system.

At flowchart block 912, in one or more of the various embodiments, layout engines may be arranged to assign each stripe chunk for each stripe to slots in the storage volumes.

In one or more of the various embodiments, layout engines may be arranged to iterate across the storage nodes and storage volumes to allocate chunks while adhering to the protection factor restrictions that have been established for the file system.

Next, in one or more of the various embodiments, control may be returned to a calling process.

Figure 10:
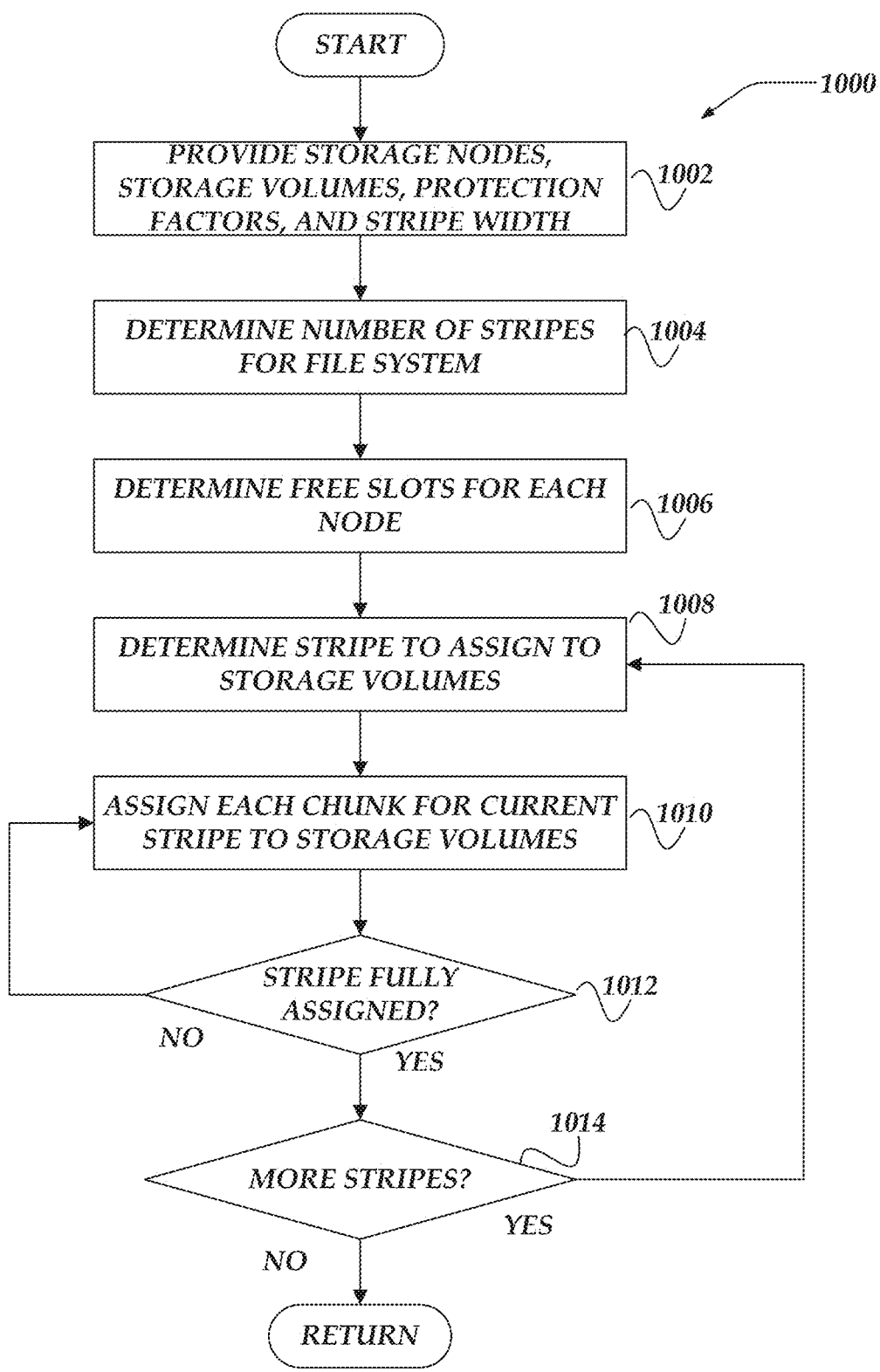
FIG. 10 illustrates a flowchart for a process for managing usable storage space in distributed file systems in accordance with one or more of the various embodiments.

FIG. 10 illustrates a flowchart for process 1000 for managing usable storage space in distributed file systems in accordance with one or more of the various embodiments. After a start flowchart block, at flowchart block 1002, in one or more of the various embodiments, storage nodes, storage volumes, protection factor information, stripe width information, or the like, may be provided for a file system. As described above, a file system may be specified and provisioned.

At flowchart block 1004, in one or more of the various embodiments, layout engines may be arranged to determine the stripes for the file system.

At flowchart block 1006, in one or more of the various embodiments, layout engines may be arranged to determine the free slots for each storage node.

In one or more of the various embodiments, layout engines may be arranged to determine free slots in a storage node based on the available capacity of the HDDs or SSDs that comprise the storage volumes in the file system.

At flowchart block 1008, in one or more of the various embodiments, layout engines may be arranged to determine a stripe for assigning storage volumes. In one or more of the various embodiments, layout engines may be arranged to process each stripe at a time. Accordingly, in some embodiments, each stripe determined for the file system may be queued for iterative processing.

At flowchart block 1010, in one or more of the various embodiments, layout engines may be arranged to assign each chunk for the current stripe to slots in storage volumes. In some embodiments, layout engines may be arranged to allocate chunks from each stripe, one stripe at a time.

At decision block 1012, in one or more of the various embodiments, if the current stripe may be fully assigned, control may flow to decision block 1014; otherwise, control may loop back to block 1010. In one or more of the various embodiments, layout engines may be arranged to allocate chunks for the current stripe to storage volumes in the storage nodes.

At decision block 1014, in one or more of the various embodiments, if there may be more stripes to allocate, control may loop back to block 1008 to allocate slots in storage volumes to the next stripe; otherwise, control may be returned to a calling process.

Figure 11:
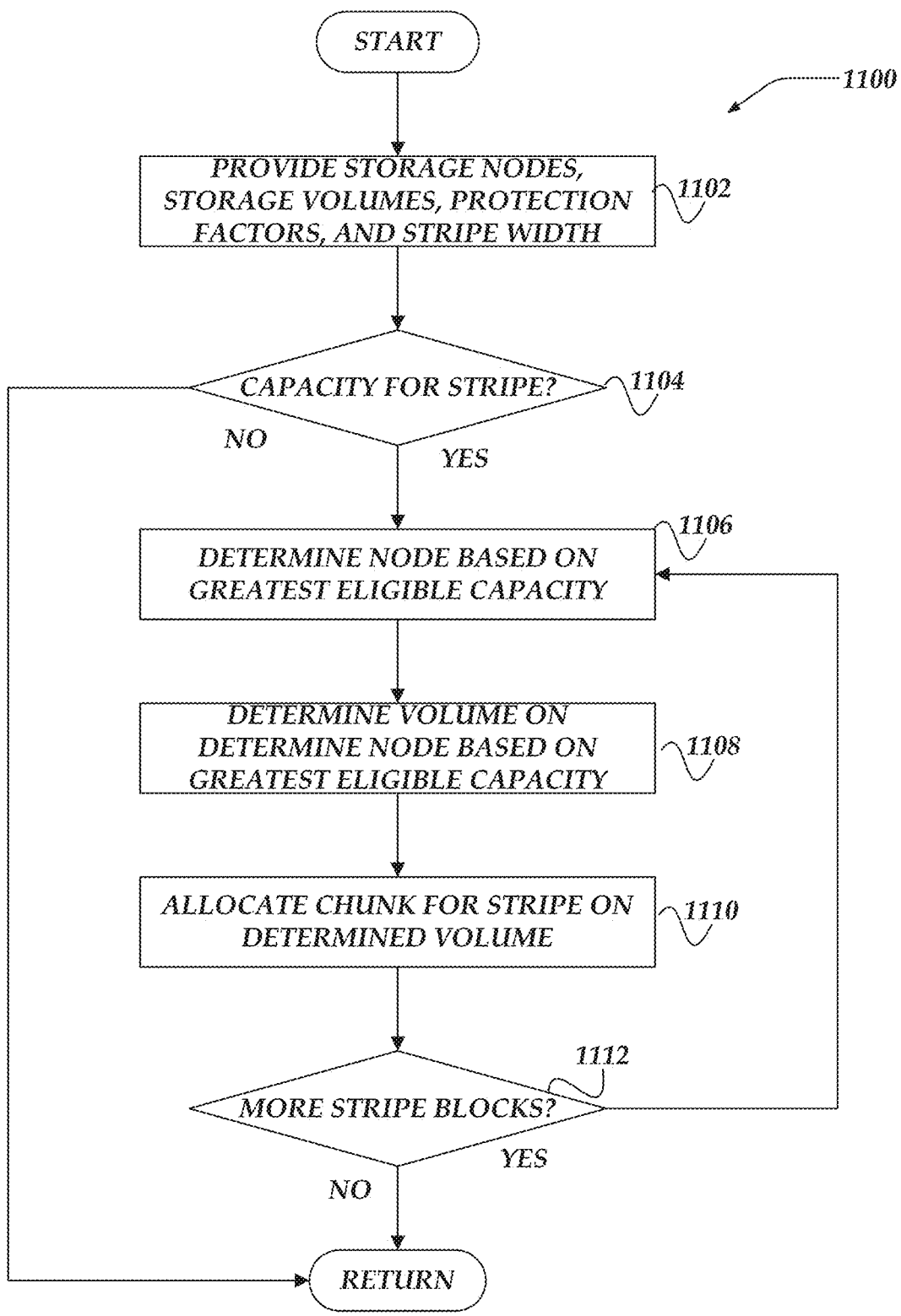
FIG. 11 illustrates a flowchart for a process for managing usable storage space in distributed file systems in accordance with one or more of the various embodiments.

FIG. 11 illustrates a flowchart for process 1100 for managing usable storage space in distributed file systems in accordance with one or more of the various embodiments. After a start flowchart block, at flowchart block 1102, in one or more of the various embodiments, storage nodes, storage volumes, protection factor information, stripe width information, or the like, may be provided for a file system. As described above, a file system may be specified and provisioned.

At decision block 1104, in one or more of the various embodiments, if there may capacity in the file system for allocating a determine stripe, control may flow to block 1106; otherwise, control may be returned to a calling process. In one or more of the various embodiments, layout engines may be arranged to continuously allocate stripes until the capacity of the file system may be exhausted. In some embodiments, layout engines may be arranged to allocate complete stripes, thus layout engines may be arranged to confirm if there may be capacity available for another stripe allocation.

At flowchart block 1106, in one or more of the various embodiments, layout engines may be arranged to determine a storage node based on it having a greatest eligible capacity.

In one or more of the various embodiments, layout engines may be arranged to evaluate the remaining/availability capacity in the storage volumes associated with the storage nodes.

However, in some embodiments, layout engines may be arranged to determine eligible capacity based on protection factor rules that may be configured for the file system. Accordingly, in some embodiments, in some cases, the storage nodes with the highest available capacity may be considered ineligible because of protection factor restrictions.

For example, if the protection factor rules set a maximum of two chunks from the same stripe on the storage node, the storage node with the most remaining capacity that has been previously allocated less than two chunks of the current stripe may be determined.

At flowchart block 1108, in one or more of the various embodiments, layout engines may be arranged to determine a storage volume in the determined storage node based on the storage volume having a greatest capacity in the storage node. As described above, storage nodes may be associated with more than one storage volume such that each storage volume (e.g., HDDs, SSDs, or the like) may have different capacities.

Also, in some embodiments, protection factor rules may restrict how many chunks from the same stripe may be allocated to each storage volume. For example, protection factor rules may establish that less than two chunks from the same stripe may be allocated to a storage node while also setting a limit of one chunk from the same stripe per storage volume. Thus, in some cases, the storage volume with the greatest capacity may be excluded from consideration based on protection factor rules.

At flowchart block 1110, in one or more of the various embodiments, layout engines may be arranged to allocate a chunk for the stripe on the determined storage volume.

In one or more of the various embodiments, layout engines may be arranged to determine the number of available slots in the determined storage volume and allocate a next available slot to the chunk of the current stripe. In some embodiments, slots may be sized to match the size of chunks such that a storage volume with 100 available slots may be allocated 100 chunks.

In one or more of the various embodiments, layout engines may be arranged to allocate slots in the sequence they occur in the storage volume. For example, the first slot of a storage volume may be allocated the first chunk of a stripe. And, for example, the next available slot may be allocated to the next presented chunk, and so on. Alternatively, in some embodiments, layout engines may be arranged to 'randomly' select a slot from the available slots in a storage volume to allocate the next presented chunk. Further, in some embodiments, layout engines may be arranged to support various distribution schemes to determine which slots to allocate presented chunks. Accordingly, in some embodiments, layout engines may be arranged to select slots for allocation based on rules, instructions, or the like, provided via configuration information to account for local requirements or local circumstances.

At decision block 1112, in one or more of the various embodiments, if there may be more chunks for the stripe to allocate, control may loop back to block 1106; otherwise, control may be returned to a calling process.

Figure 12:
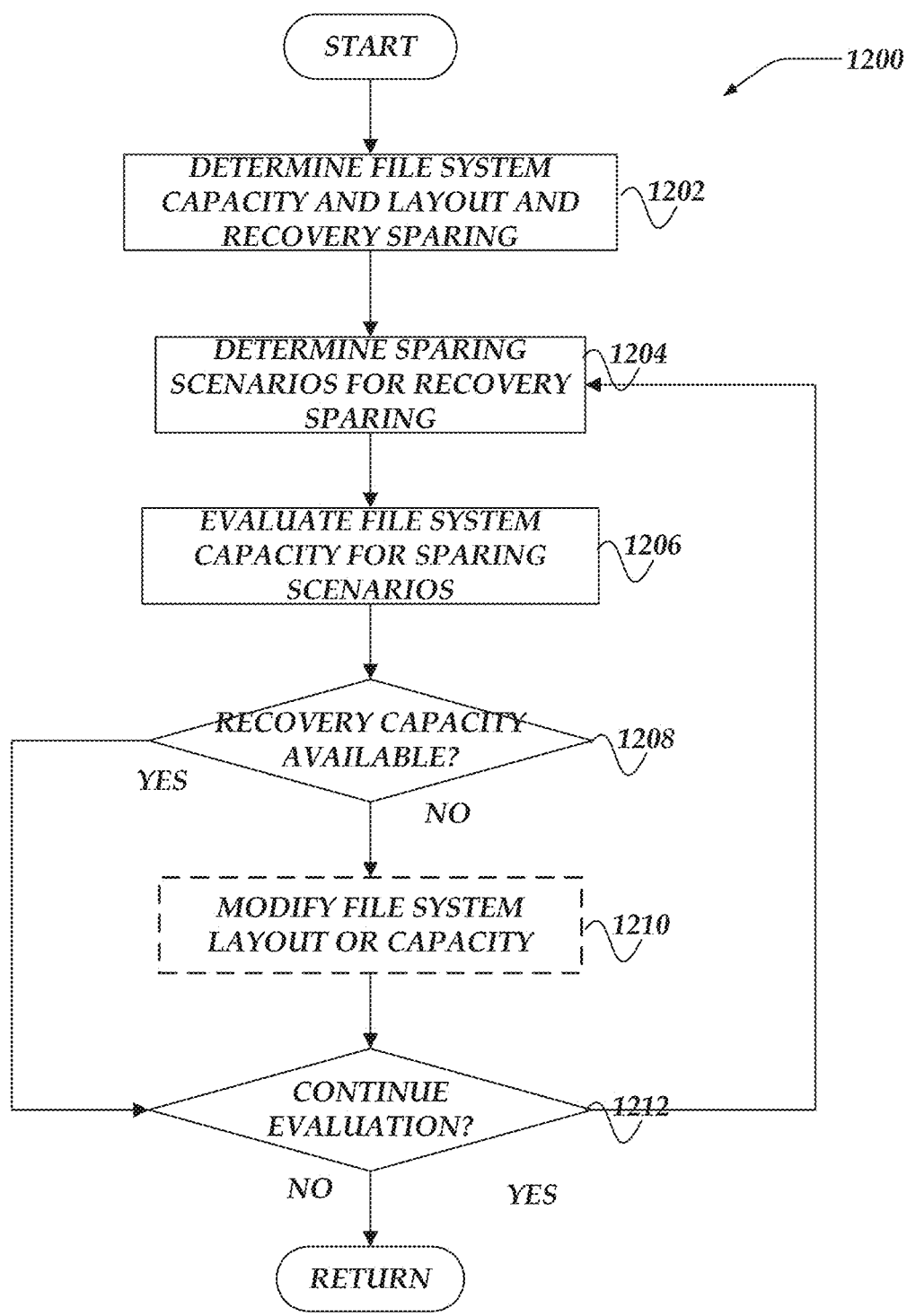
FIG. 12 illustrates a flowchart for a process for determining recovery space for managing usable storage space in distributed file systems in accordance with one or more of the various embodiments.

FIG. 12 illustrates a flowchart for process 1200 for determining recovery space for managing usable storage space in distributed file systems in accordance with one or more of the various embodiments.

In one or more of the various embodiments, it may be advantageous to provision file systems with excess storage capacity that enables some recovery operations to occur before adding replacing storage volumes (e.g., replacing failed HDDs, or the like). Accordingly, in some embodiments, if recovery capacity may be available in the file system, the file system may begin recovery operations before replacement storage volumes have been supplied.

However, in some embodiments, the heterogeneity of storage node capacity, storage volume capacity, storage volumes per storage node, or the like, of file systems may require evaluating the capacity in view of every combination of storage volume failures in the file system to determine if there may be sufficient recovery capacity in the file system.

As described above, the heterogeneity of components and protection factor rules may make it difficult to easily determine if there may be a layout for the file system if storage volumes our taken out service.

Note, in some embodiments, parity protection level may be considered independent of the amount of recovery capacity that may be available in a file system. For example, if a file system has parity protection configured to protect against two storage volumes failures, if unused recovery capacity is available, the file system may immediately begin operations to recover and re-protect the data in the file system—consuming a portion of the recovery capacity. For example, if a file system is configured to have parity protection level is 2 with a recovery capacity that supports any three disks failing. In this example, if three disks failed at the same time, there would be data loss because the parity protection is exceeded. But, in this example, if the loss of the first two disks was recovered and re-protected, the file system could still recover and re-protect from one or more subsequent disk loss before replacement disks would need to be provided. Thus, in some cases, operators are given some leeway after disk failures before replacement disks have to be installed.

After a start flowchart block, at flowchart block 1202, in one or more of the various embodiments, layout engines may be arranged to determine file system capacity and layout. As described above, layout engines may be arranged to perform one or more actions to determine the number of stripes that may fit in a file system. Also, in some embodiments, layout engines may be arranged to allocate the chunks that comprise the stripes to storage nodes and storage volumes in accordance with protection factor rules, or the like.

At flowchart block 1204, in one or more of the various embodiments, layout engines may be arranged to determine a storage volume groups for analyzing if layouts may be available if storage volumes are lost.

In one or more of the various embodiments, file systems may include one or more storage nodes with various capacity. Likewise, in some embodiments, storage nodes in file system may have one or more differently sized storage volumes. Accordingly, in some embodiments, the number of size/capacity combinations may make it disadvantageous to pre-compute storage capacities for all the combinations of potential storage loss.

Conventional file systems may loop over all cluster configurations that are missing any n-disks. For example, if a cluster with 200 storage volumes is designed to include recovery capacity for up to any three lost disks, each combination three storage volumes of the 197 storage volumes would need to be considered to determine if a layout would be available.

Accordingly, to reduce the number of states/configuration needing to be evaluated, layout engines may be arranged to determine groups of storage volumes based on the number of different types of disks in a file system. For example, a file system may have a variety of HDDs comprising 16 TB, 8 TB, and 4 TB capacities, any combination of the three different types of storage volumes may fail.

In this context, storage volumes being considered for providing sparing capacity may be referred to as sparing volumes to distinguish them from storage volumes that may be in active in a file system. Likewise, sparing volume types may correspond to the different types of storage volumes in a file system.

Accordingly, in some embodiments, the cardinality of each sparing volume evaluation set may be equivalent to the number sparing volumes that may be desired. In some embodiments, the number of evaluation sets that need to be considered depending on the combination or sparing volume types. For example, if a file system is comprised of one storage volume type such as, 16 TB and recovery sparing capacity is three sparing volumes, the number of sparing volume types is one. And, the evaluation sets for support sparing capacity of 3 storage volumes include only (16 TB, 16 TB, 16 TB)—because there may be only one combination of combining three sparing volumes of the same type. In comparison, if a file system has three different storage volume types, such as, 16 TB, 8 TB, and 4 TB the evaluation sets may include: (16 TB, 16 TB, 16 TB), (8 TB, 8 TB, 8 TB), (4 TB, 4 TB, 4 TB), (16 TB, 16 TB, 8 TB), (16 TB, 8 TB, 8 TB), (16 TB, 8 TB, 4 TB), (16 TB, 16 TB, 4 TB), (16 TB, 4 TB, 4 TB), (8 TB, 8 TB, 4 TB), and (8 TB, 4 TB, 4 TB).

At flowchart block 1206, in one or more of the various embodiments, layout engines may be arranged to evaluate file system capacity based on the sparing volume evaluation sets.

In one or more of the various embodiments, layout engines may be arranged to determine the most constrained circumstances that may support a layout of the file system by evaluating if the different sparing volume types may support of full layout of the file system. See, FIG. 13 below for more detail.

At decision block 1208, in one or more of the various embodiments, if layout engines determine sufficient recovery capacity is available, control may flow to decision block 1212; otherwise, control may flow to flowchart block 1210.

At flowchart block 1210, in one or more of the various embodiments, optionally, layout engines may be arranged to modify file system layout of capacity. In some embodiments, layout engines may be arranged to provide user interfaces, or the like, to enable users to modify one or more file system characteristics, such as, node count, storage volume count, storage volume types, stripe width, protection factors, sparing capacity, or the like, and reevaluate sparing resources/capacity.

Note, this flowchart indicated as being optional because in some cases file system administrators may choose to deploy a file system even though there may be a lack of recovery capacity.

At decision block 1212, in one or more of the various embodiments, if the capacity evaluation may continue, control may loop back to flowchart block 1204; otherwise, control may be returned to a calling process.

Figure 13:
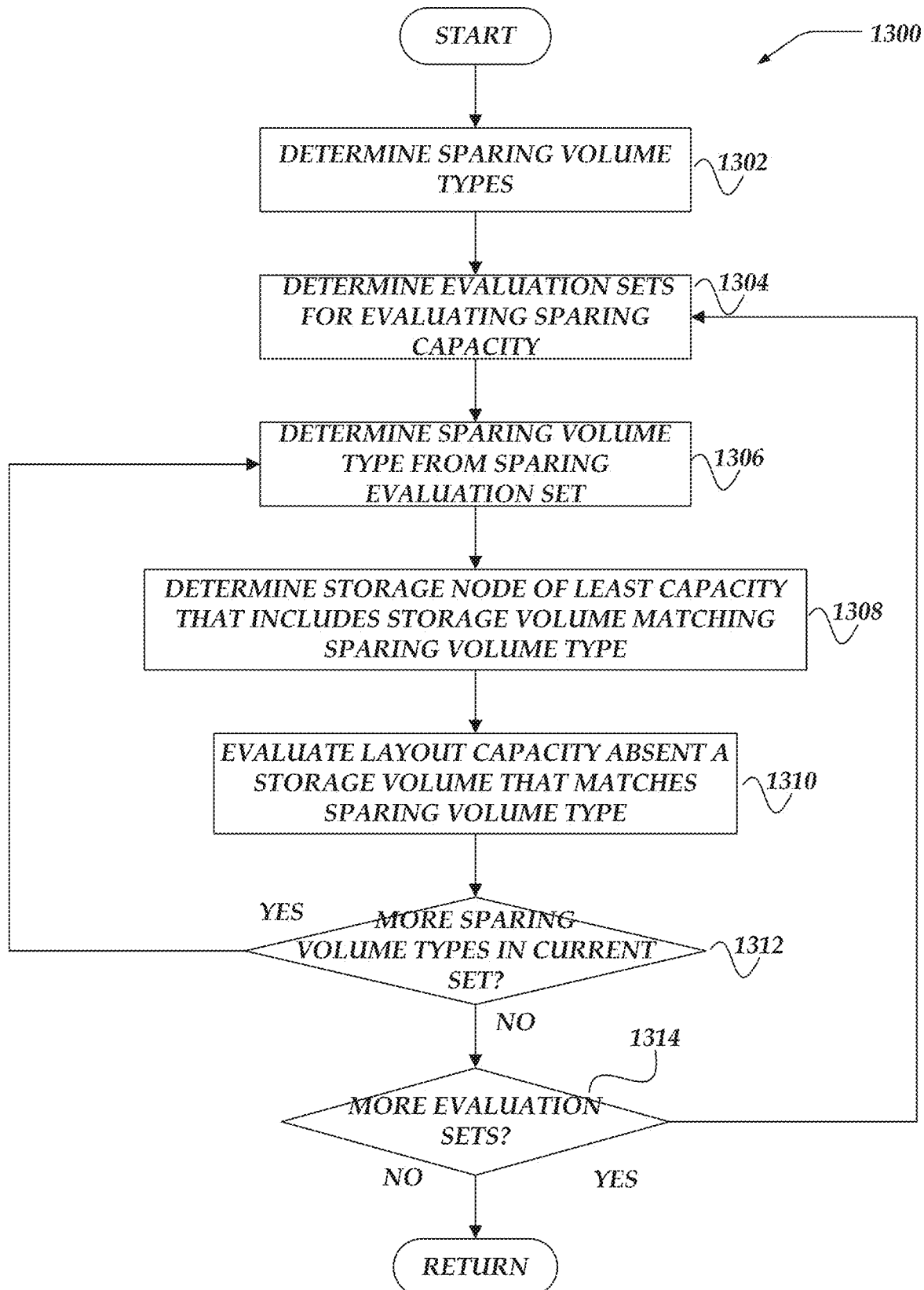
FIG. 13 illustrates a flowchart for a process for evaluating sparing volumes for managing usable storage space in distributed file systems in accordance with one or more of the various embodiments.

FIG. 13 illustrates a flowchart for process 1300 for evaluating sparing volumes for managing usable storage space in distributed file systems in accordance with one or more of the various embodiments. After a start block, at block 1302, in one or more of the various embodiments, layout engines may be arranged to determine the sparing volume types for a file system.

In one or more of the various embodiments, sparing volume types represent the type of storage volumes that a sparing volume may be employed to replace. Accordingly, in some embodiments, if a file system includes three different types of storage volumes each type having different capacity, sparing capacity of the file system may be comprised of three sparing volume types that match the storage volume types of the file system.

At block 1304, in one or more of the various embodiments, layout engines may be arranged to determine the sparing volume type sets for evaluating sparing capacity.

In one or more of the various embodiments, evaluation sets may be determined based on the combination of the sparing volume types for the file system and the desired amount of sparing capacity. For example, if there are three sparing volume types (A,B,C) to support a sparing capacity of three storage volumes, there may be ten evaluation sets such as (AAA), (AAB), (AAC), (ABB), (ABC), (ACC), (BBB), (BBC), (BCC), and (CCC).

Similarly, for some embodiments, if there may be three sparing volume types (A,B,C) and a sparing capacity of two storage volumes, there may be six evaluation sets such as (AA), (AB), (AC), (BB), (BC), and (CC).

Also, in some embodiments, evaluation sets may be sorted based on capacity highest to lowest.

At block 1306, in one or more of the various embodiments, layout engines may be arranged to determine a sparing volume type from the current sparing evaluation set.

In one or more of the various embodiments, each sparing volume type in each evaluation set may be considered. In some embodiments, layout engines may be arranged to evaluate evaluation sets starting from the lowest capacity sparing volume type in the evaluation set. Also, in some embodiments, different volume types may have different performance characteristics.

At block 1308, in one or more of the various embodiments, layout engines may be arranged to determine a storage node in the file system having the least capacity and includes a storage volume matching the sparing volume type.

At block 1310, in one or more of the various embodiments, layout engines may be arranged to evaluate layout capacity of the file system absent a storage volume on the lowest capacity storage node that matches the sparing volume type.

In one or more of the various embodiments, layout engines may be arranged to determine a storage node that has the lowest capacity of all the storage nodes in the file system and that has one of the storage volume types being evaluated. Accordingly, in some embodiments, layout engines may be arranged to compute the capacity of the selected storage node as if the storage volume of the determined storage volume type is absent. This may be considered a method to simulate if a storage volume has failed or otherwise become unavailable.

In some embodiments, layout engines may be arranged to determine if the evaluated storage node may have sufficient sparing capacity if the storage volume is unavailable. Accordingly, if the storage node with the least capacity has sufficient sparing storage capacity, even in the face of a storage volume becoming unavailable, the layout engine may determine that there is sufficient sparing capacity. Note, in some embodiments, layout engines may be arranged to determine what the sufficient amount of sparing capacity based on configuration information to account for local requirements or local circumstances.

At decision block 1312, in one or more of the various embodiments, if there may be more sparing volume types in the current evaluation set, control may loop back to block 1306; otherwise, control may flow to decision block 1314.

At decision block 1314, in one or more of the various embodiments, if there may be more evaluation sets, control may loop back to block 1304; otherwise, control may be returned to a calling process.

Figure 14A:
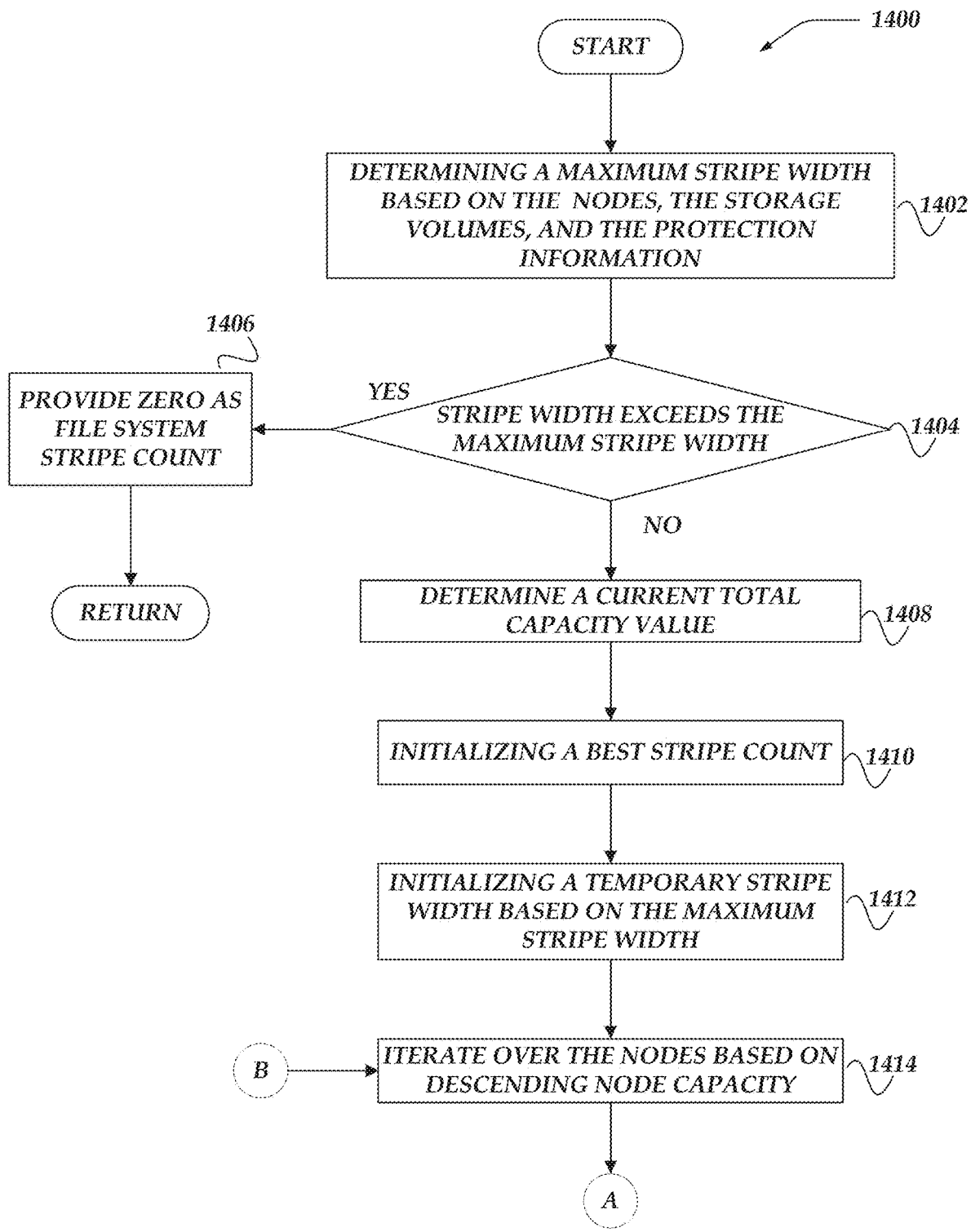
FIG. 14A illustrates a first portion of a flowchart for a process for determining the number of stripes that fit in a file system in accordance with one or more of the various embodiments.

FIG. 14A illustrates a first portion of a flowchart for process 1400 for determining the number of stripes that fit in a file system in accordance with one or more of the various embodiments. After a start block, at block 1402, in one or more of the various embodiments, layout engines may be arranged to determine a maximum stripe width supported by the file system. In some embodiments, stripe width may be the number of chunks that may be included in a single stripe. Thus, in some embodiments, a maximum stripe width represents the maximum number of chunks from the same stripe that may be allocated to a file system. In some embodiments, stripe width may be limited based on protection factors because protection factors represent a limit on the number of chunks from the same stripe that can be stored on the same storage volume or same storage node. For example, a protection factor of 2/1 means that two chunks from the same stripe may be stored on the same storage node and one chunk from the same stripe may be stored on the same storage volume. Likewise, a protection factor of 2/2 means that two chunks from the same stripe may be stored on the same storage node and two chunks from the same stripe may be stored on the same storage volume. Accordingly, in some embodiments, a file system with a protection factor or 2/1 with 10 storage nodes would support a maximum stripe width of 2*10=20. Likewise, for example, a file system with a protection factor of 2/2 with 10 storage nodes would also support a maximum stripe width of 2*10=20. Note, the second part of the protection factor that limits the number of chunks from the same stripe that may be stored on a single storage volume. Thus, in an unlikely case where a file system has only one storage volume per storage node, a 2/1 protection factor would have a maximum trip width of 10.

Also, in one or more of the various embodiments, file systems may be configured to have a different number of storage volumes per storage node. Thus, in some cases, maximum stripe width may be computed by evaluating the protection factor for each storage node. For example, if a file system has a protection factor of 4/1, storage nodes that have less than four storage volumes may limit the maximum stripe width. For example, if each storage node in a 4/1 protection factor file system has four storage volume, a file system with ten storage nodes would support a maximum stripe width of 40. However, in this example, if two of the ten storage nodes have only three storage volumes, the maximum stripe width may be 38 (4+4+4+4+4+4+4+3+3=38) rather than 40.

At decision block 1404, in one or more of the various embodiments, if the stripe width of a a stripe exceeds the maximum stripe width for the file system, control may flow to block 1406; otherwise, control may flow to block 1408. In some case, file system administrators, or the like, may attempt to deploy to a file system with stripes configured with a stripe width that exceeds the maximum stripe width for the file system. Accordingly, in some embodiments, layout engines may reject such configurations as being outsized or otherwise invalid.

At block 1406, in one or more of the various embodiments, layout engines may be arranged to provide of stripe count of zero because the stripe width exceeds the maximum stripe width of the file system. Next, control may be returned to a calling process.

At block 1408, in one or more of the various embodiments, layout engine may be arranged to determine a current total capacity of the file system. In some embodiments, layout engines may be arranged to determine the total capacity of the file system by summing up the capacity of storage volumes associated with storage nodes in the file system.

At block 1410, in one or more of the various embodiments, layout engine may be arranged to initialize a best stripe count value. In one or more of the various embodiments, layout engines may be arranged to initialize a best stripe count value based on dividing the total capacity by the width of the stripes (e.g., number of chunks per stripe).

At block 1412, in one or more of the various embodiments, layout engine may be arranged to initialize a temporary stripe width based on the maximum stripe width of the file system.

At block 1414, in one or more of the various embodiments, layout engine may be arranged to iterate over the storage nodes in the file system in a descending capacity order.

Figure 14B:
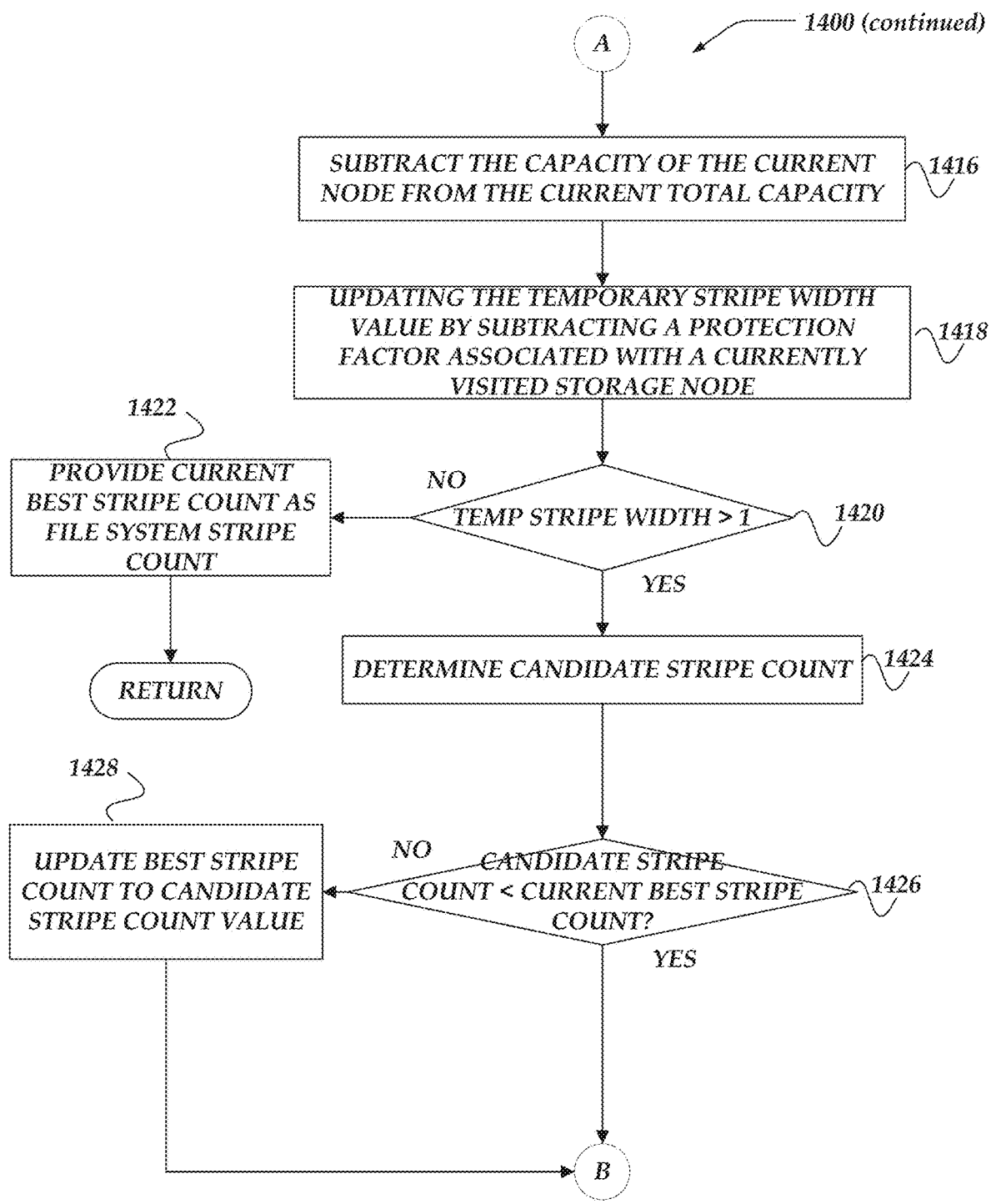
FIG. 14B illustrates a second portion of a flowchart for a process for determining the number of stripes that fit in a file system in accordance with one or more of the various embodiments.

Next, control flows to reference A in FIG. 14B.

FIG. 14B illustrates a second portion of a flowchart for process 1400 for determining the number of stripes that fit in a file system in accordance with one or more of the various embodiments. After reference A from FIG. 14A, at block 1412, in one or more of the various embodiments, layout engines may be arranged to subtract the capacity of the currently visited storage node from the current total capacity.

At block 1416, in one or more of the various embodiments, layout engines may be arranged to subtract the number of stripe buckets associated with the current storage node from a temporary stripe width value. Note, the temporary stripe width value may be initialized to be with the actual stripe width of the file system and then the temporary stripe width value may be updated as the storage nodes are evaluated.

At decision block 1418, in one or more of the various embodiments, if the temporary stripe width value is greater than one, control may flow block 1420; otherwise, control may flow to block 1422.

At block 1420, in one or more of the various embodiments, layout engine may be arranged to provide the current best stripe count value as the file system stripe count capacity. Next, control may be returned to a calling process.

At block 1424, in one or more of the various embodiments, layout engines may be arranged to determine a new candidate stripe count.

At decision block 1426, in one or more of the various embodiments, if the candidate stripe count may be less than the current best stripe count, control may flow to reference B in FIG. 14A; otherwise, control may flow to block 1428.

At block 1428, in one or more of the various embodiments, layout engines may be arranged to update the best stripe count to the value of the candidate stripe count value. Next, in some embodiments, control may loop back to reference B in FIG. 14A.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing data in a file system over a network using one or more processors that are configured to execute instructions, wherein the execution of the instructions performs actions, comprising:
    providing the file system that includes one or more storage nodes that are associated with one or more storage volumes, wherein the one or more storage volumes include two or more storage volume types that each have a different capacity for storing data;
    determining a file system storage capacity of the file system based on a number of stripes of data that fit in the file system, wherein each stripe has a same stripe storage capacity, and wherein each stripe is comprised of one or more chunks that have a same chunk storage capacity;
    determining one or more slots in the file system based on the one or more storage volumes, wherein each slot is a portion of the one or more storage volumes that matches the chunk storage capacity;
    assigning the one or more chunks to the one or more slots in the file system based on a node storage capacity of the one or more storage nodes, further comprises:
        assigning each chunk to a storage node with a most amount of unassigned node storage capacity, wherein a number of chunks allocated to a same storage volume or a same storage node is based on protection factor information that defines a maximum number of chunks from the same stripe that may be stored or assigned to the same storage volume or the same storage node;
        determining a stripe that includes one or more unassigned chunks;
        determining an unassigned chunk from the stripe based on a position of the unassigned chunk in the stripe, wherein the unassigned chunk is a nearest unassigned chunk to a beginning of the stripe;
        determining the storage volume having a greatest unassigned capacity that conforms to one or more constraints provided by the protection factor information; and
        assigning the unassigned chunk to an empty slot in the storage volume; and
    employing the file system to store data that is distributed to the one or more chunks.

2. The method of claim 1, wherein assigning the one or more chunks to the one or more slots, further comprises:
    determining a first number of chunks from the same stripe to assign to the storage volume based on the protection factor information; and
    determining a second number of chunks from the same stripe to assign to the storage node based on the protection factor information.

3. The method of claim 1, wherein determining the file system storage capacity based on the number of stripes of data that fit in the file system, further comprises:
    determining a maximum stripe width based on the one or more storage nodes, the one or more storage volumes, and the protection information; and
    in response to a stripe width of a stripe being less than or equal to the maximum stripe width, performing further actions, including:
        determining a current total capacity value based on a sum of each node storage capacity of each storage node;
        initializing a best stripe count value based on the total capacity value divided by the stripe width;
        initializing a temporary stripe width value based on the maximum stripe width;
        iterating over each storage node in descending node storage capacity, performing further actions, including:
            updating the current total capacity value by subtracting a capacity of a currently visited storage node from the current total capacity value;
            updating the temporary stripe width value by subtracting a protection factor associated with a currently visited storage node, wherein the protection factor is included in the protection information;
            in response the updated temporary stripe width value being less than one, stopping the iteration over the storage nodes and providing the current best stripe count as the number of stripes of data that fit in the file system; and
            in response to the updated temporary stripe width value being greater than or equal to one, performing further actions, including:
                determining a candidate stripe count by dividing the current total capacity value by the updated temporary stripe width value; and
                in response to the updated candidate stripe count being less than the best stripe count, updating the best stripe count to be the updated candidate stripe count.

4. The method of claim 1, further comprising:
    determining one or more evaluation sets that include two or more storage volume types;
    determining a least node storage capacity for the one or more storage nodes that includes two or more storage volumes that match the two or more storage volume types included in the one or more evaluation sets; and
    determining a spare file system storage capacity for the file system based on omitting one or more of the two or more storage volumes from the storage node having the least node storage capacity.

5. The method of claim 1, wherein providing the file system that the includes one or more storage nodes, further comprises, providing two or more storage nodes that are associated with a different amount of storage volumes.

6. A system for managing data in a file system comprising:
a network computer, comprising:
a memory that stores at least instructions; and
one or more processors that are configured to execute instructions, wherein the execution of the instructions performs actions, including:
providing the file system that includes one or more storage nodes that are associated with one or more storage volumes, wherein the one or more storage volumes include two or more storage volume types that each have a different capacity for storing data;
determining a file system storage capacity of the file system based on a number of stripes of data that fit in the file system, wherein each stripe has a same stripe storage capacity, and wherein each stripe is comprised of one or more chunks that have a same chunk storage capacity;
determining one or more slots in the file system based on the one or more storage volumes, wherein each slot is a portion of the one or more storage volumes that matches the chunk storage capacity;
assigning the one or more chunks to the one or more slots in the file system based on a node storage capacity of the one or more storage nodes, further comprises:
assigning each chunk to a storage node with a most amount of unassigned node storage capacity, wherein a number of chunks allocated to a same storage volume or a same storage node is based on protection factor information that defines a maximum number of chunks from the same stripe that may be stored or assigned to the same storage volume or the same storage node;
determining a stripe that includes one or more unassigned chunks;
determining an unassigned chunk from the stripe based on a position of the unassigned chunk in the stripe, wherein the unassigned chunk is a nearest unassigned chunk to a beginning of the stripe;
determining the storage volume having a greatest unassigned capacity that conforms to one or more constraints provided by the protection factor information; and
assigning the unassigned chunk to an empty slot in the storage volume; and
employing the file system to store data that is distributed to the one or more chunks; and
a client computer, comprising:
a memory that stores at least instructions; and
one or more processors that are configured to execute instructions, wherein the execution of the instructions performs actions, including, providing one or more portions of the data that is distributed to the one or more chunks.

7. The system of claim 6, wherein assigning the one or more chunks to the one or more slots, further comprises:
determining a first number of chunks from the same stripe to assign to the storage volume based on the protection factor information; and
determining a second number of chunks from the same stripe to assign to the storage node based on the protection factor information.

8. The system of claim 6, wherein determining the file system storage capacity based on the number of stripes of data that fit in the file system, further comprises:
determining a maximum stripe width based on the one or more storage nodes, the one or more storage volumes, and the protection information; and
in response to a stripe width of a stripe being less than or equal to the maximum stripe width, performing further actions, including:
determining a current total capacity value based on a sum of each node storage capacity of each storage node;
initializing a best stripe count value based on the total capacity value divided by the stripe width of the stripe;
initializing a temporary stripe width value based on the maximum stripe width;
iterating over each storage node in descending node storage capacity, performing further actions, including:
updating the current total capacity value by subtracting a capacity of a currently visited storage node from the current total capacity value;
updating the temporary stripe width value by subtracting a protection factor associated with a currently visited storage node, wherein the protection factor is included in the protection information;
in response the updated temporary stripe width value being less than one, stopping the iteration over the storage nodes and providing the current best stripe count as the number of stripes of data that fit in the file system; and
in response to the updated temporary stripe width value being greater than or equal to one, performing further actions, including:
determining a candidate stripe count by dividing the current total capacity value by the updated temporary stripe width value; and
in response to the updated candidate stripe count being less than the best stripe count, updating the best stripe count to be the updated candidate stripe count.

9. The system of claim 6, wherein the one or more network computer processors execute instructions that perform actions, further comprising:
determining one or more evaluation sets that include two or more storage volume types;
determining a least node storage capacity for the one or more storage nodes that includes two or more storage volumes that match the two or more storage volume types included in the one or more evaluation sets; and
determining a spare file system storage capacity for the file system based on omitting one or more of the two or more storage volumes from the storage node having the least node storage capacity.

10. The system of claim 6, wherein providing the file system that the includes one or more storage nodes, further comprises, providing two or more storage nodes that are associated with a different amount of storage volumes.

11. A processor readable non-transitory storage media that includes instructions for managing data in a file system over a network, wherein one or more processors on one or more network computers are configured to execute the instructions, wherein execution of the instructions performs actions, comprising:
providing the file system that includes one or more storage nodes that are associated with one or more storage volumes, wherein the one or more storage volumes include two or more storage volume types that each have a different capacity for storing data;

determining a file system storage capacity of the file system based on a number of stripes of data that fit in the file system, wherein each stripe has a same stripe storage capacity, and wherein each stripe is comprised of one or more chunks that have a same chunk storage capacity;

determining one or more slots in the file system based on the one or more storage volumes, wherein each slot is a portion of the one or more storage volumes that matches the chunk storage capacity;

assigning the one or more chunks to the one or more slots in the file system based on a node storage capacity of the one or more storage nodes, further comprises:

assigning each chunk to a storage node with a most amount of unassigned node storage capacity, wherein a number of chunks allocated to a same storage volume or a same storage node is based on protection factor information that defines a maximum number of chunks from the same stripe that may be stored or assigned to the same storage volume or the same storage node;

determining a stripe that includes one or more unassigned chunks;

determining an unassigned chunk from the stripe based on a position of the unassigned chunk in the stripe, wherein the unassigned chunk is a nearest unassigned chunk to a beginning of the stripe;

determining the storage volume having a greatest unassigned capacity that conforms to one or more constraints provided by the protection factor information; and assigning the unassigned chunk to an empty slot in the storage volume; and employing the file system to store data that is distributed to the one or more chunks.

12. The media of claim 11, wherein assigning the one or more chunks to the one or more slots, further comprises:

determining a first number of chunks from the same stripe to assign to the storage volume based on the protection factor information; and determining a second number of chunks from the same stripe to assign to the storage node based on the protection factor information.

13. The media of claim 11, wherein determining the file system storage capacity based on the number of stripes of data that fit in the file system, further comprises:

determining a maximum stripe width based on the one or more storage nodes, the one or more storage volumes, and the protection information; and in response to a stripe width of a stripe being less than or equal to the maximum stripe width, performing further actions, including:

determining a current total capacity value based on a sum of each node storage capacity of each storage node;

initializing a best stripe count value based on the total capacity value divided by the stripe width of the stripe;

initializing a temporary stripe width value based on the maximum stripe width;

iterating over each storage node in descending node storage capacity, performing further actions, including:

updating the current total capacity value by subtracting a capacity of a currently visited storage node from the current total capacity value;

updating the temporary stripe count value by subtracting a protection factor associated with a currently visited storage node, wherein the protection factor is included in the protection information;

in response the updated temporary stripe count value being less than one, stopping the iteration over the storage nodes and providing the current best stripe count as the number of stripes of data that fit in the file system; and in response to the updated temporary stripe width value being greater than or equal to one, performing further actions, including:

determining a candidate stripe count by dividing the current total capacity value by the updated temporary stripe width value; and in response to the updated candidate stripe count being less than the best stripe count, updating the best stripe count to be the updated candidate stripe count.

14. The media of claim 11, further comprising:

determining one or more evaluation sets that include two or more storage volume types;

determining a least node storage capacity for the one or more storage nodes that includes two or more storage volumes that match the two or more storage volume types included in the one or more evaluation sets; and determining a spare file system storage capacity for the file system based on omitting one or more of the two or more storage volumes from the storage node having the least node storage capacity.

15. The media of claim 11, wherein providing the file system that the includes one or more storage nodes, further comprises, providing two or more storage nodes that are associated with a different amount of storage volumes.

16. A network computer for managing data in a file system, comprising:

a memory that stores at least instructions; and one or more processors that are configured to execute instructions, wherein execution of the instructions performs actions, including:

providing the file system that includes one or more storage nodes that are associated with one or more storage volumes, wherein the one or more storage volumes include two or more storage volume types that each have a different capacity for storing data;

determining a file system storage capacity of the file system based on a number of stripes of data that fit in the file system, wherein each stripe has a same stripe storage capacity, and wherein each stripe is comprised of one or more chunks that have a same chunk storage capacity;

determining one or more slots in the file system based on the one or more storage volumes, wherein each slot is a portion of the one or more storage volumes that matches the chunk storage capacity;

assigning the one or more chunks to the one or more slots in the file system based on a node storage capacity of the one or more storage nodes, further comprises:

assigning each chunk to a storage node with a most amount of unassigned node storage capacity, wherein a number of chunks allocated to a same storage volume or a same storage node is based on protection factor information that defines a maximum number of chunks from the same stripe that may be stored or assigned to the same storage volume or the same storage node;

determining a stripe that includes one or more unassigned chunks;

determining an unassigned chunk from the stripe based on a position of the unassigned chunk in the stripe, wherein the unassigned chunk is a nearest unassigned chunk to a beginning of the stripe;

determining the storage volume having a greatest unassigned capacity that conforms to one or more constraints provided by the protection factor information; and assigning the unassigned chunk to an empty slot in the storage volume; and employing the file system to store data that is distributed to the one or more chunks.

17. The network computer of claim 16, wherein assigning the one or more chunks to the one or more slots, further comprises:

determining a first number of chunks from the same stripe to assign to the storage volume based on the protection factor information; and determining a second number of chunks from the same stripe to assign to the storage node based on the protection factor information.

18. The network computer of claim 16, wherein determining the file system storage capacity based on the number of stripes of data that fit in the file system, further comprises:

determining a maximum strip width based on the one or more storage nodes, the one or more storage volumes, and the protection information; and in response to a stripe width of a stripe being less than or equal to the maximum stripe width, performing further actions, including:

determining a current total capacity value based on a sum of each node storage capacity of each storage node;

initializing a best stripe count value based on the total capacity value divided by the maximum stripe width;

initializing a temporary stripe width value based on the maximum stripe width;

iterating over each storage node in descending node storage capacity, performing further actions, including:

updating the current total capacity value by subtracting a capacity of a currently visited storage node from the current total capacity value;

updating the temporary stripe width value by subtracting a protection factor associated with a currently visited storage node, wherein the protection factor is included in the protection information;

in response the updated temporary stripe width value being less than one, stopping the iteration over the storage nodes and providing the current best stripe count as the number of stripes of data that fit in the file system; and in response to the updated temporary stripe width value being greater than or equal to one, performing further actions, including:

determining a candidate stripe count by dividing the current total capacity value by the updated temporary stripe width value; and in response to the updated candidate stripe count being less than the best stripe count, updating the best stripe count to be the updated candidate stripe count.

19. The network computer of claim 16, further comprising:

determining one or more evaluation sets that include two or more storage volume types;

determining a least node storage capacity for the one or more storage nodes that includes two or more storage volumes that match the two or more storage volume types included in the one or more evaluation sets; and determining a spare file system storage capacity for the file system based on omitting one or more of the two or more storage volumes from the storage node having the least node storage capacity.

20. The network computer of claim 16, wherein providing the file system that the includes one or more storage nodes, further comprises, providing two or more storage nodes that are associated with a different amount of storage volumes.

* * * * *